(12) United States Patent
Bialk et al.

(10) Patent No.: US 7,802,287 B2
(45) Date of Patent: Sep. 21, 2010

(54) METHOD AND SYSTEM FOR GENERATING GEOGRAPHIC VISUAL DISPLAYS OF BROADBAND NETWORK DATA

(75) Inventors: Harvey R. Bialk, Littleton, Douglas County, CO (US); Jyoti A. Kulkarni, Englewood, Arapahoe County, CO (US); Paul E. Schauer, Highlands Ranch, Douglas County, CO (US)

(73) Assignee: AT&T Intellectual Property II, L.P., Reno, NV (US)

( * ) Notice: Subject to any disclaimer, the term of this patent is extended or adjusted under 35 U.S.C. 154(b) by 3084 days.

(21) Appl. No.: 09/850,910

(22) Filed: May 8, 2001

(65) Prior Publication Data

US 2004/0031059 A1    Feb. 12, 2004

(51) Int. Cl.
*H04N 7/16* (2006.01)
*H04N 7/173* (2006.01)

(52) U.S. Cl. .................. 725/107; 725/116; 725/119; 725/127; 725/146; 725/148

(58) Field of Classification Search .................. 725/129, 725/107, 37
See application file for complete search history.

(56) References Cited

U.S. PATENT DOCUMENTS

| | | | |
|---|---|---|---|
| 4,972,453 A | 11/1990 | Daniel et al. | |
| 5,513,171 A | 4/1996 | Ludwiczak et al. | |
| 5,519,830 A | 5/1996 | Opoczynski | |
| 5,559,955 A | 9/1996 | Dev et al. | |
| 5,608,447 A | 3/1997 | Farry et al. | |
| 5,640,505 A | 6/1997 | Hearn et al. | |
| 5,761,432 A | 6/1998 | Bergholm et al. | |
| 5,943,318 A | 8/1999 | Badiee | |
| 6,023,775 A | 2/2000 | Fujii | |
| 6,137,793 A | 10/2000 | Gorman et al. | |
| 6,308,174 B1 | 10/2001 | Hayball et al. | |
| 6,490,620 B1 | 12/2002 | Ditmer et al. | |
| 6,711,135 B1 | 3/2004 | Dziekan et al. | |

FOREIGN PATENT DOCUMENTS

| | | |
|---|---|---|
| EP | 0 820 203 A | 1/1998 |
| WO | WO 96/38930 A1 | 6/1996 |
| WO | WO 99/15950 A1 | 9/1998 |
| WO | WO 99/15950 A | 4/1999 |
| WO | WO 00/74304 A2 | 4/2000 |
| WO | WO 01/30043 A2 | 10/2000 |

OTHER PUBLICATIONS

European Search Report Communication dated Aug. 31, 2004 for European Patent Application No. 02 253 205.5.

(Continued)

*Primary Examiner*—Dominic D Saltarelli
(74) *Attorney, Agent, or Firm*—Brooks Kushman P.C.

(57) ABSTRACT

A hybrid fiber coax (HFC) network management method and system for use in a broadband network having a hybrid fiber coax (HFC) network provided with network elements operable for communicating telephony, data, and video signals with customer-premises equipment of a subscriber includes an HFC network manager for monitoring status and configuration of the network elements and the customer-premises equipment. A service, design, and inventory (SDI) database is operable with the HFC network manager for storing data indicative of the configuration of the network elements and the customer-premises equipment. A fault manager having an alarm visualization tool is operable with the HFC network manager and the SDI database for generating visual displays of the status and configuration of the network elements and the customer-premises equipment.

13 Claims, 14 Drawing Sheets

OTHER PUBLICATIONS

Bhatti S.N. et al.: "On Management of CATV Full Service Networks: A European Perspective" IEEE Network, IEEE Inc., New York, U.S. vol. 12, No. 5, Sep. 1998, pp. 28-39.

Gardner R. D. et al.: "Pattern Discovery and Specification Techniques for Alarm Correlation" Network Operations and Management Symposium, 1998. NOMS 98., IEEE New Orleans, LA, USA Feb. 15-20,1998, New York, NY, USA, IEEE, US Feb. 15, 1998, pp. 713-722.

Haritsa J.R. et al.: "Mandate: Managing Networks Using Database Technology" IEEE Journal on Selected Areas in Communications, IEEE Inc., New York, U.S., vol. 11, No. 9, Dec. 1, 1993, pp. 1360-1372.

80

110

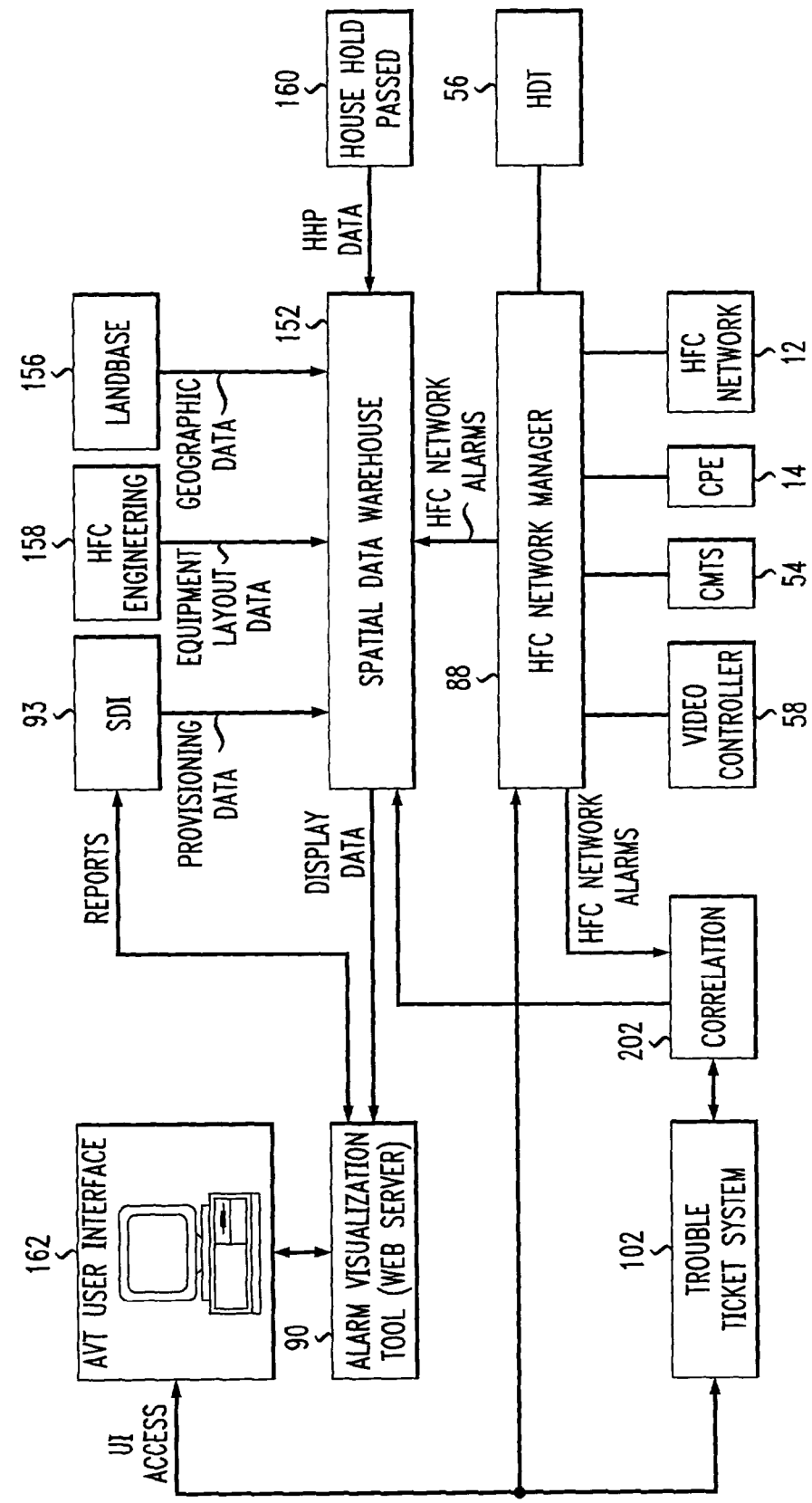

METHOD AND SYSTEM FOR GENERATING GEOGRAPHIC VISUAL DISPLAYS OF BROADBAND NETWORK DATA

CROSS-REFERENCE TO RELATED APPLICATIONS

This application is related to co-pending application "Network Management Method and System for Managing A Broadband Network Providing Multiple Services" application Ser. No. 09/851,234 filed concurrently, co-pending application "Method and System for Provisioning Broadband Network Resources" application Ser. No. 09/851,235 filed concurrently, and co-pending application "Method and System for Providing an Efficient Use of Broadband Network Resources" application Ser. No. 09/851,285 filed concurrently.

TECHNICAL FIELD

The present invention relates generally to broadband networks such as hybrid fiber coax (HFC) networks and, more particularly, to a method and system for generating geographic visual displays which identify HFC network- and supported-service affecting alarms and correlate these alarms to customer proximity, HFC plant and HFC network element proximity, and connectivity proximity for the resolution of alarms, problems, and customer service.

BACKGROUND ART

Broadband networks such as hybrid fiber coax (HFC) networks deliver video, telephony, data, and, in some cases, voice over Internet Protocol (VoIP) services to customers. Unlike traditional twisted pair local distribution networks, an HFC network must be managed to meet the capacity, availability, and reliability requirements of multiple services. Video, telephony, and data services share the same transport infrastructure to the customer's service location. Because this relationship exists, it is important that the set of HFC network management solutions meet the requirements of the HFC network and the requirements of the services transported by the HFC network to customers.

Previously, many of the infrastructure elements in an HFC network could not be actively monitored due to the limited availability of remote surveillance capabilities in the HFC network elements. Traditionally, local operations response and restoration methods relied heavily on the receipt and correlation of customer trouble reports to identify and sectionalize service-affecting conditions. HFC network element manufacturers did not actively pursue incorporating status-monitoring functionality because this increased the cost of the network elements for which there was no significant demand.

The introduction of high-speed data access and cable telephony services (along with traditional cable video services) into the HFC network created an immediate need for enhanced monitoring capabilities. This need is being addressed by the deployment of external transponders associated with HFC network elements such as power supplies and fiber nodes. Additional surveillance capabilities are provided via the deployment of enhanced service network elements (i.e., host digital terminals (HDT)/network interface units (NIU) for telephony, cable modem termination systems (CMTS)/cable modems for data access such as Internet access) and element management systems. While this equipment provides a higher-level status monitoring it provides only a logical network view at best. The ability of an HFC network management system to correlate alarms to physical plant outages requires a network inventory/configuration manager that contains accurate physical network topology data.

The ability to sectionalize HFC plant outages is important for many reasons. One of the most important reasons is that a typical local workforce is divided by skill sets and training into separate groups such as head end (HE) technicians responsible for the services equipment and distribution facilities located within the cable HE offices, line technicians responsible for the outside HFC distribution plant, and premises technicians responsible for customer-premises terminating equipment. The ability to determine where a problem resides allows the operator to dispatch the proper technician to the proper location to resolve the problem immediately. For example, this eliminates situations where a line technician is dispatched only to learn that there is a premises problem and vice versa.

The installation of increasing numbers of addressable intelligent end points in the HFC network (i.e., NIUs, cable modems) and transponders on HFC network elements along with network topology data provides the required information for an HFC network management system to monitor network and service performances levels. This can be achieved provided each of the HFC network elements and their location relative to the physical network are accurately represented in a database and are available to the operators responsible for HFC network surveillance. Then, either automatically or via a network operations technician, notification can be sent to a properly qualified technician without the need for manual sectionalization and multiple dispatches. This capability will reduce response and repair times dramatically.

A critical component of HFC network customer service is the ability to rapidly identify and resolve HFC network issues. Accordingly, what is needed is a method and system for generating geographic visual displays which identify HFC network and supported service-affecting alarms and correlate these alarms to data such as customer proximity data, HFC plant and HFC network element proximity data, and connectivity proximity data for the resolution of alarms, problems, and customer service. Such geographic displays enable operators to determine what troubles are related to each other, in what segment of the HFC network the troubles are located, the customers impacted by the troubles, and the cause of the troubles.

SUMMARY OF THE INVENTION

Accordingly, it is an object of the present invention to provide a method and system for generating visual displays of hybrid fiber coax (HFC) network data.

It is another object of the present invention to provide a method and system for generating visual displays which identify HFC network and supported service-affecting alarms and correlate these alarms to customer proximity, HFC plant and HFC network element proximity, and connectivity proximity for the resolution of alarms, problems, and customer service.

In carrying out the above objects and other objects, the present invention provides a broadband network having a hybrid fiber coax (HFC) network provided with network elements operable for communicating telephony, data, and video signals with customer-premises equipment of a subscriber. The broadband network includes a fault manager having an alarm visualization tool operable for generating visual displays of the status and configuration of the network elements and the customer-premises equipment. The broadband network may further include an HFC network manager for monitoring status and configuration of the network elements wherein the fault manager is operable with the HFC network manager for generating the visual displays. Additionally, the broadband network may include a service, design, and inventory (SDI) system having a database operable with the HFC network manager for storing data indicative of the configuration of the network elements and the customer-premises equipment wherein the fault manager is operable with the HFC network manager and the SDI database for generating the visual displays.

In the broadband network, a landbase database stores data indicative of geography of the broadband network. The alarm visualization tool is operable with the HFC network manager, the SDI database, and the landbase database for generating the visual displays overlaid with the geography of the broadband network. An HFC network engineering database stores data indicative of engineering layout of the broadband network. The alarm visualization tool is operable with the HFC network manager, the SDI database, and the HFC network engineering database for generating the visual displays overlaid with the engineering layout of the broadband network. A household passed database stores data indicative of households passed in the broadband network. The alarm visualization tool is operable with the HFC network manager, the SDI database, and the household passed database for generating the visual displays overlaid with the households passed in the broadband network.

The SDI database may further store data indicative of physical and logical connections between the HFC network elements and the customer-premises equipment. The alarm visualization tool generates visual displays of the status and configuration of the network elements and the customer-premises equipment along with the physical and logical connections between the HFC network elements and the customer-premises equipment.

The HFC network manager may generate alarm data indicative of improper status and configuration of the network elements and the customer-premises equipment. The alarm visualization tool generates visual displays of the status and configuration of the network elements and the customer-premises equipment overlaid with the alarm data. The alarm visualization tool generates visual displays of the alarm data via at least one of color codes and icons representing the network elements and the customer-premises equipment.

The SDI database may be operable to generate an SDI system report for at least one of a network element and a customer-premises equipment. The report includes information about the at least one network element and the customer-premises equipment. The alarm visualization tool is operable for the displaying SDI system reports for a selected network element and customer-premises equipment on the visual displays.

The broadband network may further include a trouble ticket system operable for generating trouble ticket alerts in response to improper status of at least one of the network elements and the customer-premises equipment. The alarm visualization tool is operable with the trouble ticket system for displaying the trouble ticket alerts for the at least one of the network elements and the customer-premises equipment having improper status on the visual displays. The alarm visualization tool may be further operable with HFC network manager and the trouble ticket system for generating trouble ticket alerts with auto-populated status information.

The broadband network may further include a correlation system for correlating data including trouble ticket alerts generated by the trouble ticket system and the status of the network elements and the customer-premises equipment monitored by the HFC network manager. The alarm visualization tool displays the correlated data on the visual displays.

Further, in carrying out the above objects and other objects, the present invention provides an associated HFC network management method.

The above objects and other objects, features, and advantages of the present invention are readily apparent from the following detailed description of the best mode for carrying out the present invention when taken in connection with the accompanying drawings.

BRIEF DESCRIPTION OF THE DRAWINGS

FIGS. 11, 12, 13, and 14 illustrate respective block diagrams of the AVT within first, second, third, and fourth HFC network management configurations.

DETAILED DESCRIPTION OF THE DRAWINGS

Figure 1:
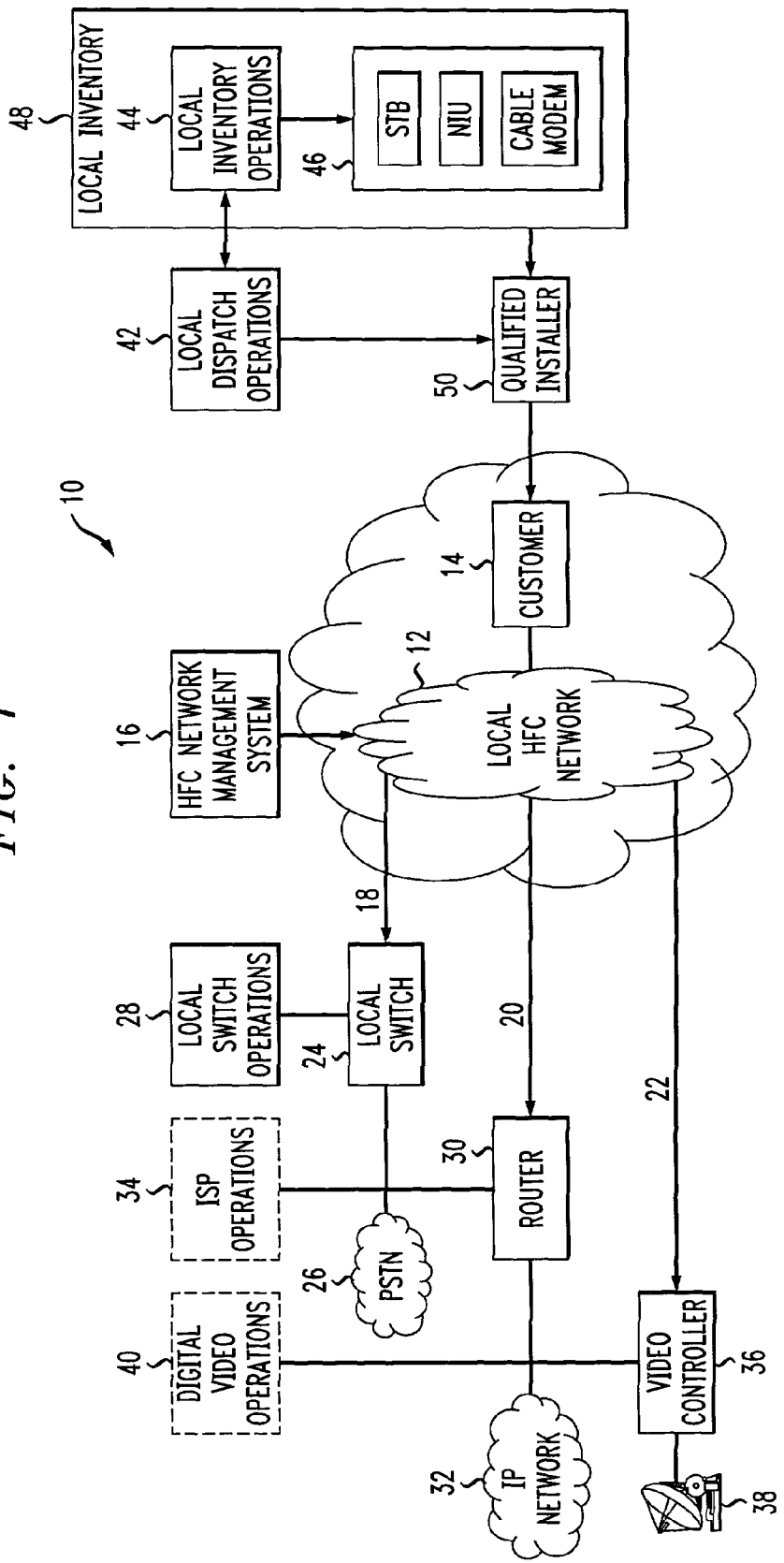
FIG. 1 illustrates a simplified block diagram of a broadband network having a hybrid fiber coax (HFC) network in accordance with a preferred embodiment of the present invention.

Referring now to FIG. 1, a broadband network 10 in accordance with a preferred embodiment of the present invention is shown. Broadband network 10 includes a hybrid fiber coax (HFC) network 12 for distributing telephony, data, and video (and voice over Internet Protocol (VoIP)) services to a customer 14 connected to the HFC network. An HFC network management system 16 is operable with HFC network 12 for managing the HFC network. In general, HFC network management system 16 focuses on the provisioning, maintenance, and assurance of telephony, data, video and VoIP services over HFC network 12 for a customer 14. HFC network management system 16 provides automated system capabilities in the areas of HFC services, network element provisioning, and fault management.

HFC network 12 is operable for receiving and transmitting telephony, data, and video signals from/to a telephony service network 18, a data service network 20, and a video service network 22. HFC network 12 distributes telephony, data, and video signals from respective networks 18, 20, and 22 to a customer 14 connected to the HFC network. Telephony service network 18 includes a local switch 24 for connecting the public switched telephone network (PSTN) 26 to HFC network 12 and a local switch operations center 28 for controlling the local switch. Similarly, data service network 20 includes a data router 30 for connecting an Internet Protocol (IP) data network 32 to HFC network 12 and a Internet Service Provider (ISP) operations center 34 for controlling the router. Video service network 22 includes a video controller 36 for connecting a video source 38 to HFC network 12 and a video operations center 40 for controlling the video controller.

Customer 14 includes customer-premises equipment (CPE) elements for connecting with HFC network 12 to receive/transmit the telephony, data, and video signals. A local dispatch operations center 42 assists in provisioning the desired network elements to customer 14. Local dispatch operations center 42 communicates with a local inventory operations database 44 to select a desired (CPE) element 46 stored in a local inventory 48. Such CPE elements 46 include a set-top box (STB) for video service, a network interface unit (NIU) for telephony service, and a cable modem for data service. A qualified installer 50 receives instructions from local dispatch operations center 42 for installing a desired CPE element 46 stored in local inventory on the premises of customer 14.

Figure 2:
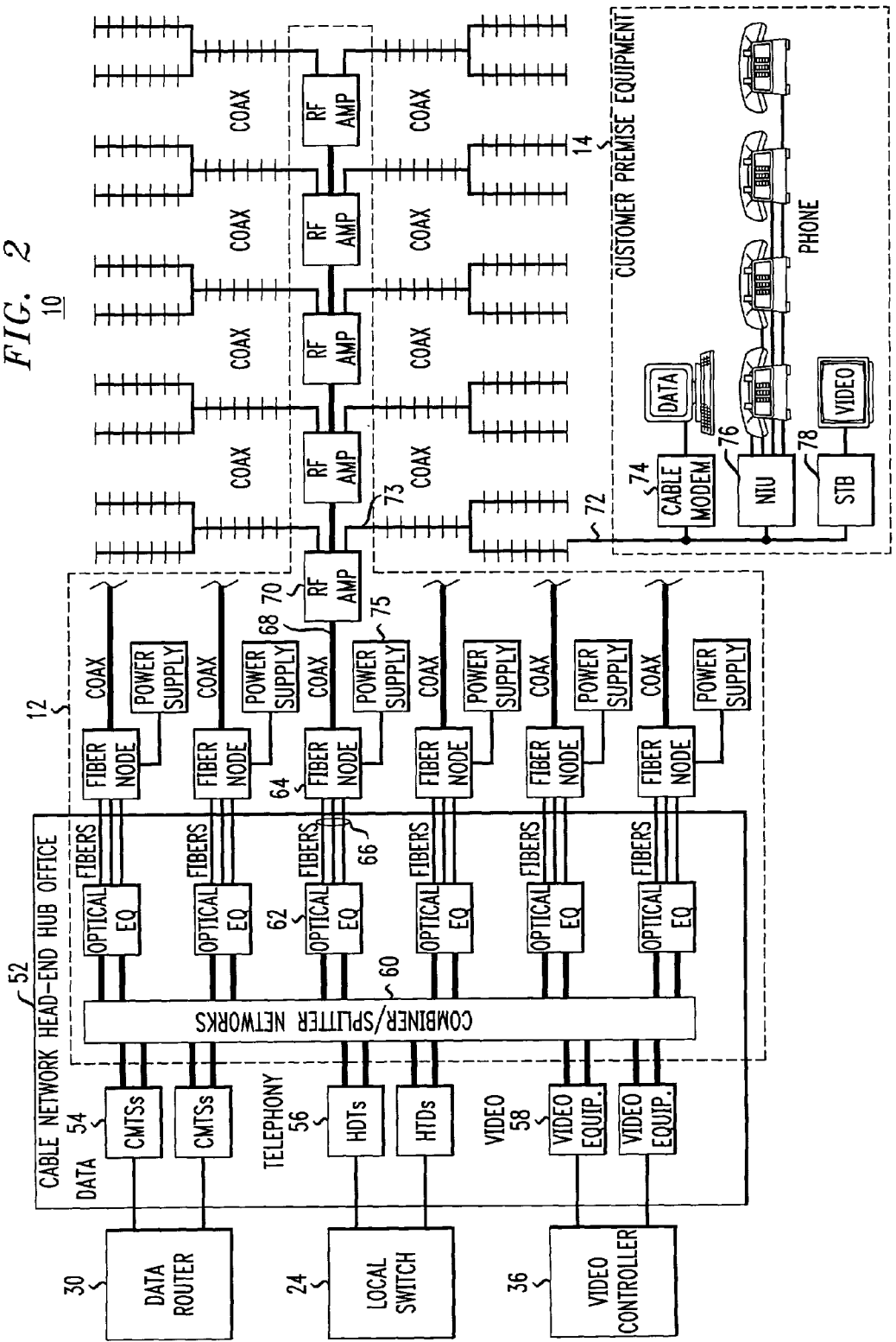
FIG. 2 illustrates a more detailed view of the broadband network shown in FIG. 1.

Referring now to FIG. 2, a more detailed view of broadband network 10 is shown. Broadband network 10 includes a cable network head-end/hub office 52. Data router 30, local switch 24, and video controller 36 are operable with hub office 52 to transmit/receive data, telephony, and video signals to/from customer 14 via HFC network 12. Hub office 52 includes a cable modem termination system (CMTS) 54 for communicating data signals such as IP data to/from data router 30; a host digital terminal (HDT) 56 for communicating telephony signals to/from local switch 24; and video equipment 58 for communicating video signals to/from video controller 36.

The head end of HFC network 12 is located within hub office 52 and connects with CMTS 54, HDT 56, and video equipment 58 for distributing the data, telephony, and video signals to/from customer 14. Specifically, HFC network 12 includes a combiner/splitter network 60 connected to CMTS 54, HDT 56, and video equipment 58. For communicating signals to customer 14, combiner/splitter network 60 combines the data, telephony, and video signals into a combined signal and provides the combined signal to optical equipment 62. Optical equipment 62 (such as a primary or secondary hub ring) converts the combined signal into an optical signal and distributes the combined optical signal to a fiber node 64 via optical fibers 66. Fiber node 64 is generally located in the neighborhood of customer 14. A typical fiber node serves up to 1,200 customers and is powered by a power supply 75. Power supply 75 generates status information and has a transponder for communicating the status information to HFC network management system 16. Fiber node 64 converts the combined optical signal into a combined electrical signal for distribution on coaxial cable 68 located in the neighborhood of customer 14. An amplifier 70 amplifies the combined electrical signal and then provides the combined electrical signal to a fiber node bus 73 and a port 72 associated with customer 14.

Customer 14 includes customer-premises equipment such as a cable modem 74, a network interface unit (NIU) 76, and a set-top box (STB) 78. Cable modem 74 extracts the data signal from the combined electrical signal; NIU 76 extracts the telephony signal from the combined electrical signal; and STB 78 extracts the video signal from the combined electrical signal. In order to communicate signals from customer 14 to hub office 52 for receipt by data router 30, local switch 24, and video controller 36, the signal flow process is reversed and combiner/splitter network 60 in hub office 52 splits the signal from the customer to the appropriate service network (data, telephony, or video).

Figure 3:
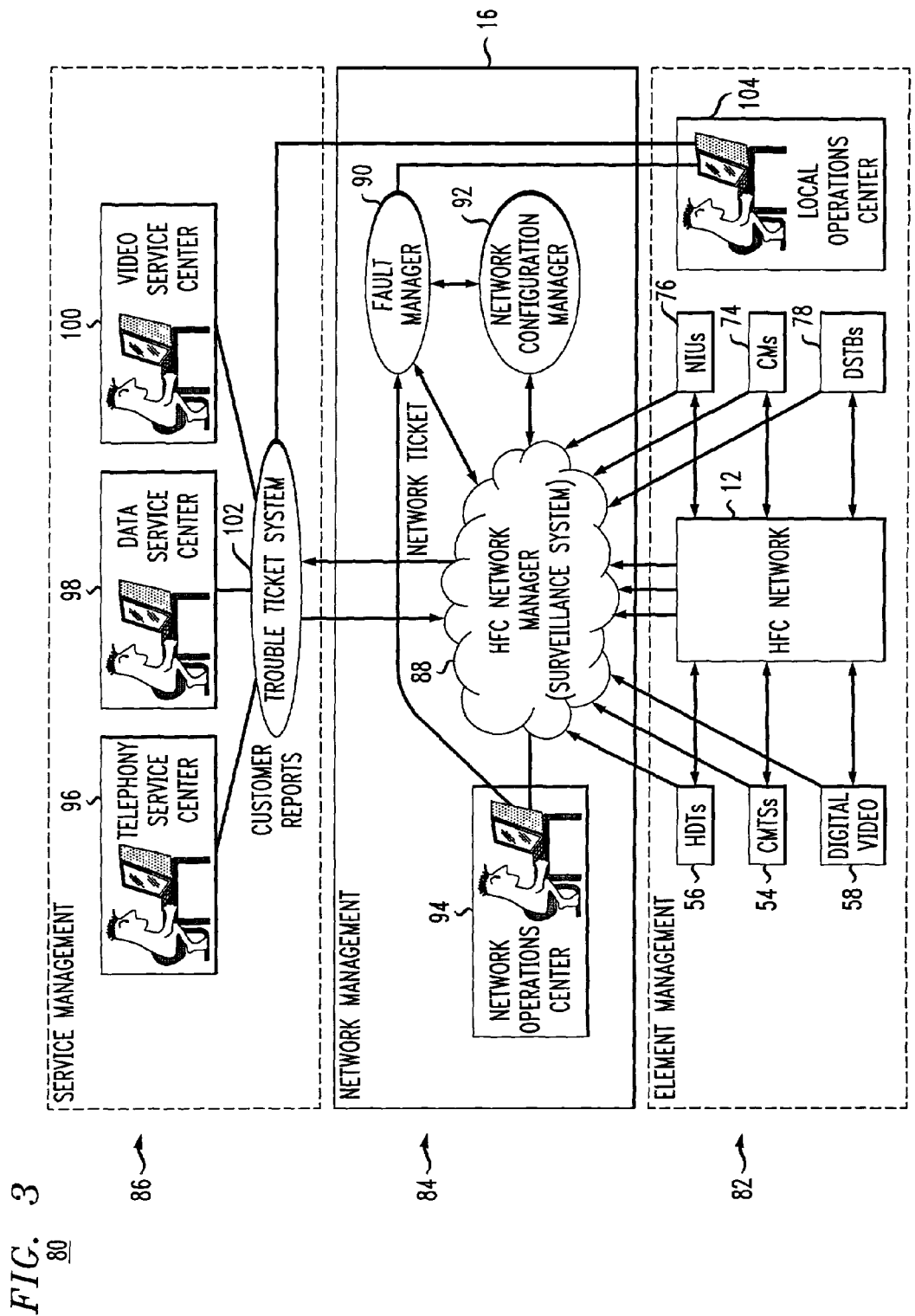
FIGS. 3 and 4 illustrate the Telecommunications Managed Networks (TMN) model of the HFC network management system in accordance with a preferred embodiment of the present invention.

Referring now to FIG. 3, a model 80 implementing HFC network management system 16 is shown. In general, the system capabilities within HFC network management system 16 are designed to adhere to the Telecommunications Managed Networks (TMN) model of the International Telecommunications Union. In accordance with the TMN model, model 80 includes an element management layer 82, a network management layer 84, and a service management layer 86. The service and provisioning systems provided by HFC network management system 16 spans all three management layers 82, 84, and 86.

Element management layer 82 is the physical equipment layer. Element management layer 82 models individual pieces of equipment such as HDTs 56, CMTSs 54, video equipment 58, cable modems 74, NIUs 76, and STBs 78 along with facility links in HFC network 12. Element management layer 82 further models the data and processes necessary to make the equipment and facility links provide desired functionality. Element management layer 82 passes information to network management layer 84 about equipment problems, and instructions are received by the network management layer to activate, modify, or deactivate equipment features.

Network management layer 84 includes network management system 16. Network management system 16 generally includes a network manager 88, a fault manager 90, a network configuration manager 92, and a network operations center (NOC) 94 as will be described in greater detail below. Network management layer 84 deals with the interfaces and connections between the pieces of equipment. As such, network management layer 84 breaks down higher-level service requests into actions for particular systems required to implement these requests. Without a connectivity model, individual equipment systems are merely islands that must be bridged by human intervention.

Service management layer 86 associates customers 14 with services provided by HFC network 12. Business service centers such as telephony service center 96, data service center 98, and video service center 100 are the primary part of service management layer 86 because they allow customers to request service. The provisioning activity originates from service management layer 86. Service management layer 86 further includes a trouble ticket system 102 for issuing trouble tickets to a local operations center 104.

In general, model 80 illustrates the systems and interfaces that support the functions of HFC network management system 16 with respect to HFC network 12 and the services that are provided by the HFC network. These functions, together with processes and systems, support business requirements such as HFC automated provisioning, automated trouble ticket creation and handling, and automated data analysis and reporting.

The functions of HFC management system 16 generally include HFC network-specific functions, services-specific network management functions, and HFC network- and services-specific functions. The HFC network-specific functions are status monitoring (surveillance), HFC network management, fault management (alarm correlation and trouble isolation), and performance management. The services-specific network management functions are network capacity management, service assurance (trouble ticketing and administration), network element management (elements are service-specific, e.g., HDTs support telephony service, CMTSs support data services, etc.), performance management, and system management (routers). The HFC network- and services-specific functions are configuration management and provisioning.

The processes and systems related to the functions of HFC management system 16 include sources of network topology data, network inventory and configuration management, network and services provisioning, network surveillance, network alarm correlation, network fault management, capacity management, service assurance, HFC telephony, data, and video element management systems, and system management.

By integrating the functions, processes, and systems described above HFC network management system 16 can support various integrated applications. These integrated applications include automated HFC provisioning for telephony services, auto trouble ticket creation, visual outage correlation, and customer service representation.

Figure 4:
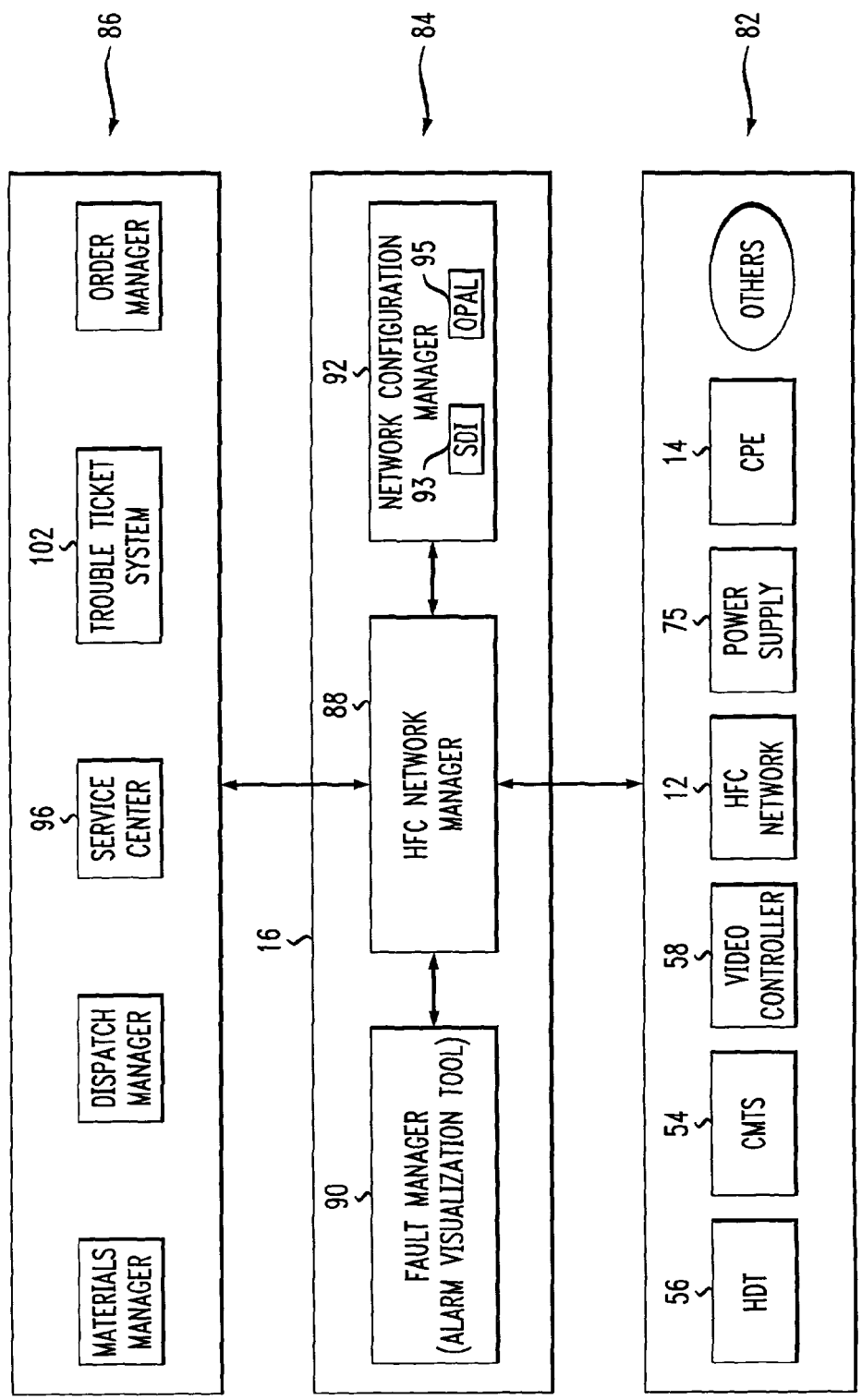

Referring now to FIG. 4, a block-level illustration of HFC network management system 16 implementation of the TMN model is shown. As described with reference to FIG. 3, element management layer 82 includes network elements 54, 56, and 58, HFC network 12, power supply 75, customer-premises elements 14, and other equipment. Element management layer 82 provides status information regarding these elements to HFC network manager 88 of HFC network management system 16 located in network management layer 84. HFC network manager 88 provides instructions to element management layer 82 on how to configure the elements located in the element management layer. HFC network manager 88 also provides information to service management layer 86 regarding the configuration of the elements within the element management layer and whether there are any problems with the configuration.

In general, HFC network management system 16 provides mechanization and automation of operation tasks for HFC network 12. In order to support these operation tasks, network management layer 84 of HFC network management system 16 includes HFC network manager 88, a fault manager 90, and a network configuration manager 92. Fault manager 90 includes a geographical information system tool referred to herein as an alarm visualization tool (AVT). AVT 90 supports visual correlation of network elements and customer impact. Network configuration manager 92 includes a service, design, and inventory (SDI) system 93 having a database representing HFC network 12. SDI database 93 stores data representing the assigned capacity of HFC network 12. Network configuration manager 92 further includes an online provisioning application link (OPAL) 95. OPAL 95 accommodates automated provisioning of services to customers. The association of HFC system- and service-specific network elements and associated facilities provides surveillance and fault management tools that aid network operations center 94 and local operations center 104 to respond to service-affecting network events.

A brief overview of the main components in model 80 will now be described. Trouble ticket system 102 of service management layer 86 is used to support customer trouble management and the fault management process of HFC network management system 16. Trouble ticket system 102 supports all services (telephony, data, and video) and supports automated data collection for analysis and reporting systems. Interfaces to HFC network manager 88 and SDI system 93 are implemented to support network-generated tickets and field maintenance trouble referrals.

AVT 90 demonstrates and verifies the applicability of graphical visualization of HFC network 12 and service alarms. AVT 90 includes capabilities for assisting telephony, video, and data maintenance operations in the trouble sectionalization, isolation, and resolution process. AVT 90 provides geographical displays with varying zoom levels (from country to street and household level) overlaid with node boundary, distribution plant layout, and equipment at single dwelling unit (SDU) and multiple dwelling unit (MDU) premises. The views of AVT 90 also represent switch and head end locations, associated hubs, secondary hubs, and connectivity between them. Alarm and status information are shown via color codes and icon size of the equipment representations. AVT 90 displays ticket indicators as representations (icons) separate from alarms. Through these geographical views an operator will be able to visually correlate event information. AVT 90 also assists operators in initiating trouble resolution processes via the ability to launch trouble tickets from the displays. AVT 90 also allows context sensitive access to diagnostics.

HFC network manager 88 supports the alarm surveillance and fault management process. HFC network manager 88 includes a rules-based object-oriented system to support auto ticket creation through trouble ticket system 102 and a geographic information system for visual correlation and alarm correlation with support from SDI system 93.

SDI system 93 is a network configuration management application that supports HFC network provisioning, fault management, and capacity management processes. The database of SDI system 93 also serves as the database of record for supporting the alarm correlation of the fault management process. OPAL 95 provides auto provisioning functionality with the assistance of SDI system 93.

HFC Network-Specific Functions

The network-specific functions are functions that are common to HFC network 12 regardless of the services (telephony, data, video) that are offered by HFC network.

1. Status Monitoring

Status monitoring for the HFC plant includes telemetry information and is deployed in all power supplies and fiber nodes. This technology contributes to network availability by enabling preemptive maintenance activities to head off network outages. Status monitoring alerts are useful in detecting problems with standby inverter batteries. This alone enables proactive maintenance to ensure the ability to ride through short-duration electric utility outages. Alerts from cable plant power supplies also determine when standby generators should be deployed to maintain powering through long-duration commercial power outages. Upstream spectrum management systems are deployed to accept autonomously generated messages that indicate a degraded condition in the upstream bands. Fundamentally, these systems are spectrum analyzers with the capability of masking normal spectrum behaviors from abnormal conditions and reporting such abnormalities.

2. Network Management

HFC network manager 88 supports fault management functions for HFC network 12. Included in the supported fault management functions are surveillance of the HFC outside plant, message filtering, basic alarm management (e.g., notify, clear, retire alarms), and test access support. HFC network manager 88 also supports visual alarm correlation, management of some provisioning command execution, and exporting status and traffic information to network operations center 94.

HFC network manager 88 aggregates device fault information and includes a software system that allows development of message-processing rules and behaviors. HFC network manager 88 includes standard modules for communicating with any network protocol. The software resides on a server in each local market. This ensures scalability, reliability, local visibility, fault location, and a distributed computing environment. The numerous connectivity capabilities ensure that HFC network manager 88 can communicate with AVT 90, SDI system 93, and OPAL 95.

HFC network manager 88 is the primary tool available to technicians of network operations center 94. Because HFC network manager 88 interfaces to the various-vendor provided element management systems, the HFC network manager provides a uniform view for network operations center 94 into those systems. This insulates the technicians from each piece of equipment that has its own particular management system and protocol. Additionally, the current fault rule sets perform one universal function of displaying faults as messages are received and clearing the fault when a corresponding clear is received. This contrasts with many vendor element management systems which provide a continuously streaming arrays of messages where faults and clears are shown on the same screen sorted by time only.

Because HFC network manager 88 is a rule-based system, the HFC network manager can implement advanced criteria designed by network and equipment subject-matter experts into tangible behaviors described below. Such behaviors are a powerful tool for managing the projected numbers of faults.

3. Fault Management

Prior to HFC network management system 16, manual correlation of information available from network elements was used to isolate problems. Incoming alarms were read from tabular listings on multiple workstations. Additional information was then obtained about location and serving area from databases, maps, and spreadsheets. Trouble tickets were reviewed to see if related customer problems existed. This method demonstrated the effectiveness of correlation, but is very time consuming and may result in details being overlooked due to the manual nature of the process.

The present invention provides enhanced correlation methods for fault management can be obtained through a strategy that combines automated, visual, and cross-product correlation of customer-reported problems and status information from intelligent network elements. The present invention presents this information in an automated user-friendly fashion, network managers can quickly isolate problems in the network as to their root cause and location.

HFC network manager 88 is the data collection and processing engine for telephony, data, and video equipment. Alerts from element managers and customer-reported problem data from trouble ticketing system 102 are managed by HFC network manager 88. HFC network manager 88 processes these alerts against predefined rule sets to perform advanced correlation. HFC network manager 88 dips into the database of SDI system 93 to look up the logical relationships and service address information that the calculations require. HFC network manager 88 stores the results from the correlation processing in a database.

AVT 90 is used in parallel to automated event correlation. AVT 90 includes a spatial database that relates alarm information from HFC network manager 88 with network configuration data from the database of SDI system 93, geo-coded homes passed information, and landbase and spatial data. AVT 90 is a web-based graphics tool that allows network operations center 94 to view real-time status of faults in broadband network 10. This maximizes the efficiency and effectiveness of network operations center 94 in identifying telephony alarms and correlation of these alarms to customer proximity, plant and equipment proximity, and connectivity proximity for the resolution of alarms, problems, and customer service.

The following sections describe how automated correlation along with visual and cross-product correlation is performed in accordance with a preferred embodiment of the present invention. In addition, the description of reports that are generated by SDI system 93 in support of the fault management is provided.

a. Automated Correlation

Systems that can perform automated correlation of managed elements are needed to establish associations between problems with customer's service and the equipment that delivers those services. In order to perform automated correlation, logical connectivity relationships need to be established between the elements of broadband network 10 and the common equipment and transmission paths. A database (the database of SDI system 93) representing the local network connectivity (HFC infrastructure) and the elements connected to the network will enable the delivery of services (telephony, data, and video) to a customer location. This database is needed as a source of reference for HFC network management system 16. In order to support fault management capability through automated correlation, the database of SDI system 93 must be an accurate database. The database of SDI system 93 models and inventories head end equipment, fiber node, and CPE. Connectivity and serving area information for this equipment is established as part of the provisioning process for advanced services.

b. Visual Correlation

Visual correlation enables network operations center 94 to relate the location of faulted CPE with HFC network 12 feeding them. AVT 90 displays street maps of the regions that have been overlaid with HFC cable plant diagrams. These maps also show the serving area boundaries for each fiber node. In addition to this static information, color-coded dynamic symbols representing type of service, status of intelligent network elements, and the customer-reported problems are also displayed. Geo-coding of network elements and customer service addresses enables the symbols to be accurately located on the maps relative to the streets and physical plant. This method quickly presents a visual indication of services that are experiencing problems and the location of customers impacted.

c. Cross-Product Correlation

Correlation is significantly more powerful when multiple services are provided. By determining if one or more products in the same section of the network are experiencing problems or are operating normally, common equipment and transmission paths can be identified and eliminated as the trouble source.

Figure 5:
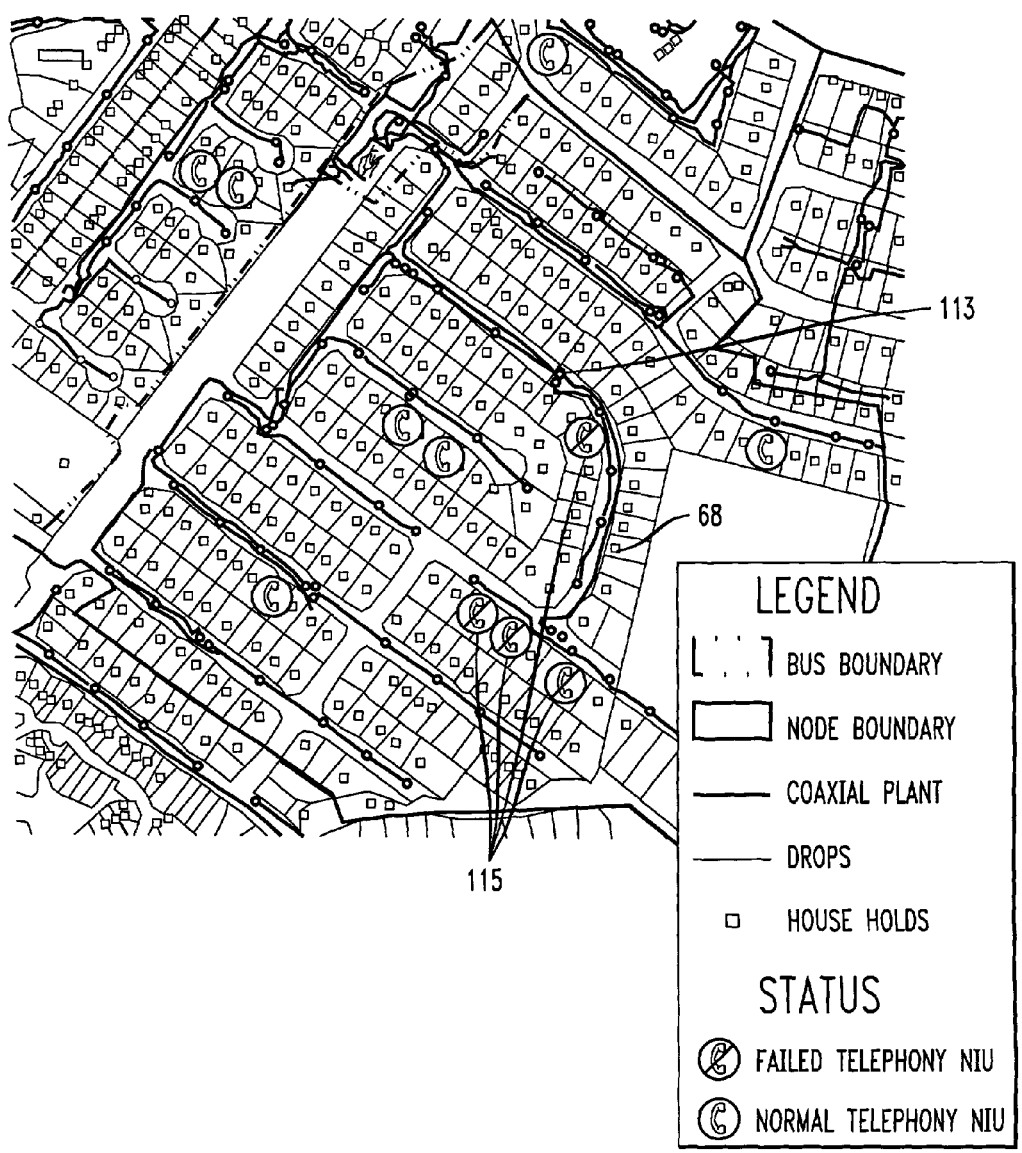
FIGS. 5, 6, and 7 illustrate examples of visual correlation displays generated by the alarm visualization tool of the HFC network management system.

FIG. 5 illustrates an example of a visual correlation display 110 of some failed telephony NIUs 115 generated by AVT 90. Display 110 provides a great deal of information about the location of a telephony problem. In addition to the failed telephony NIUs 115, display 110 shows the importance of knowing what is in the normal state. In display 110 it is still uncertain if the problem is in cable plant 68 or head end 52. It appears that a single amplifier 113 feeds all the failed telephony NIUs 115.

Automated correlation information can further isolate the problem by indicating if the same modem equipment in head end 52 serves all the failed cable modems 127. It could also indicate if any working cable modems 125 are served by the same modem equipment in head end 52. If they are not, or there are working devices off that same modem equipment in head end 52, then it is likely that the problem is in cable plant

68. If they are served by the same modem equipment in head end 52, then trouble location is not certain. Additional information from other products could contribute in further isolating the problem.

Figure 6:
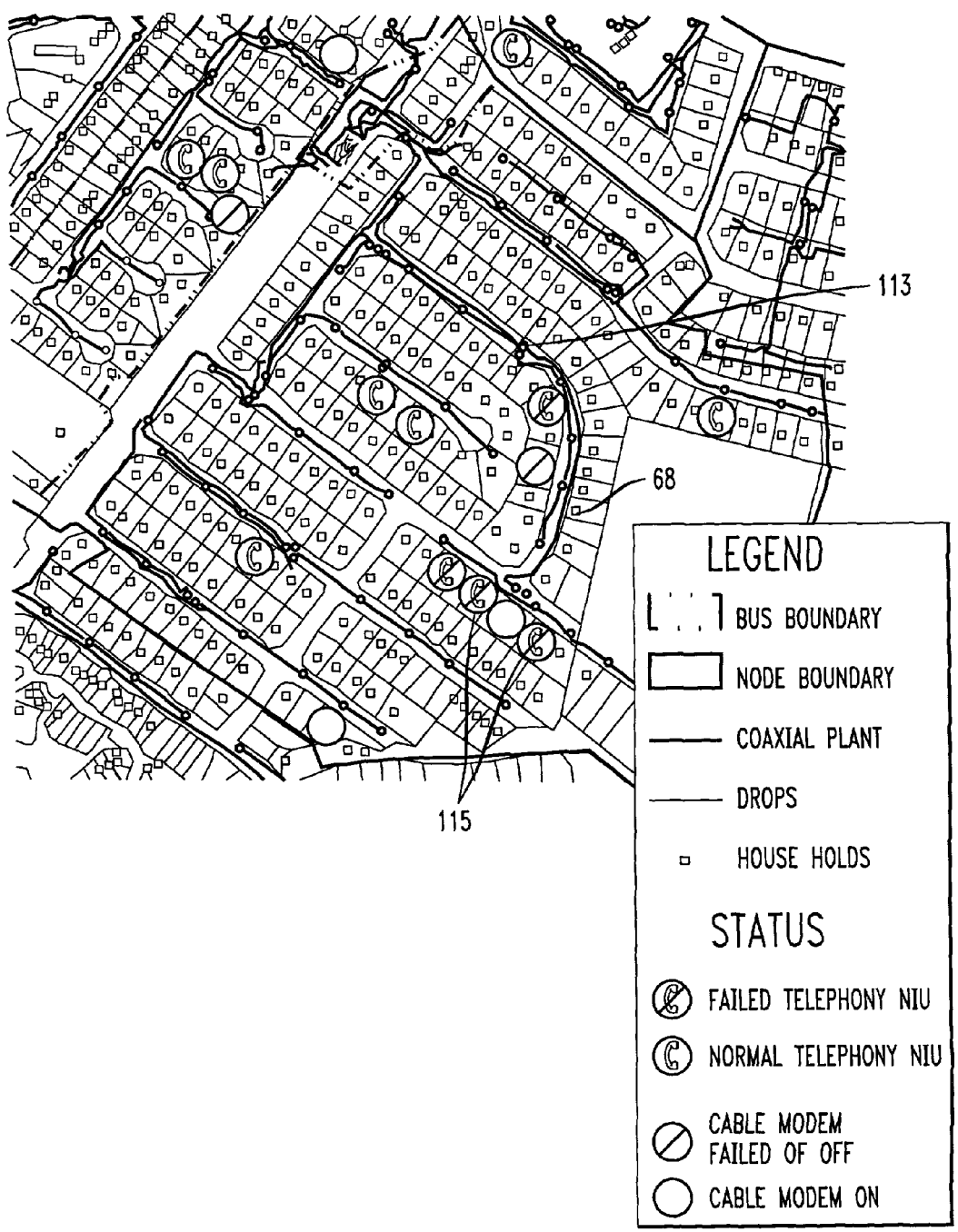

FIG. 6 illustrates a second visual correlation display 120 generated by AVT 90. Display 120 includes Internet cable modem status information. Correlation can now be made against cable modems 125 and 127. In the area of the failed telephony NIUs 115 there is one operating cable modem 125. Even though other modems in the node are turned off this one piece of information indicates that cable plant 68 serving this area may be properly functioning. Looking for trouble at head end 52 may make more sense than sending a technician to look for line problems, particularly if all the failed telephony devices 115 are off the same cable modem equipment in head end 52.

In addition to the alarm data from the intelligent network elements, trouble ticketing system 102 provides the address and trouble type information from customer-reported problems. This is also displayed on the mapping system. The report clusters from this source can be useful in identifying soft failures, degradation, or content problems that are not accompanied by active elements but impact service.

Figure 7:
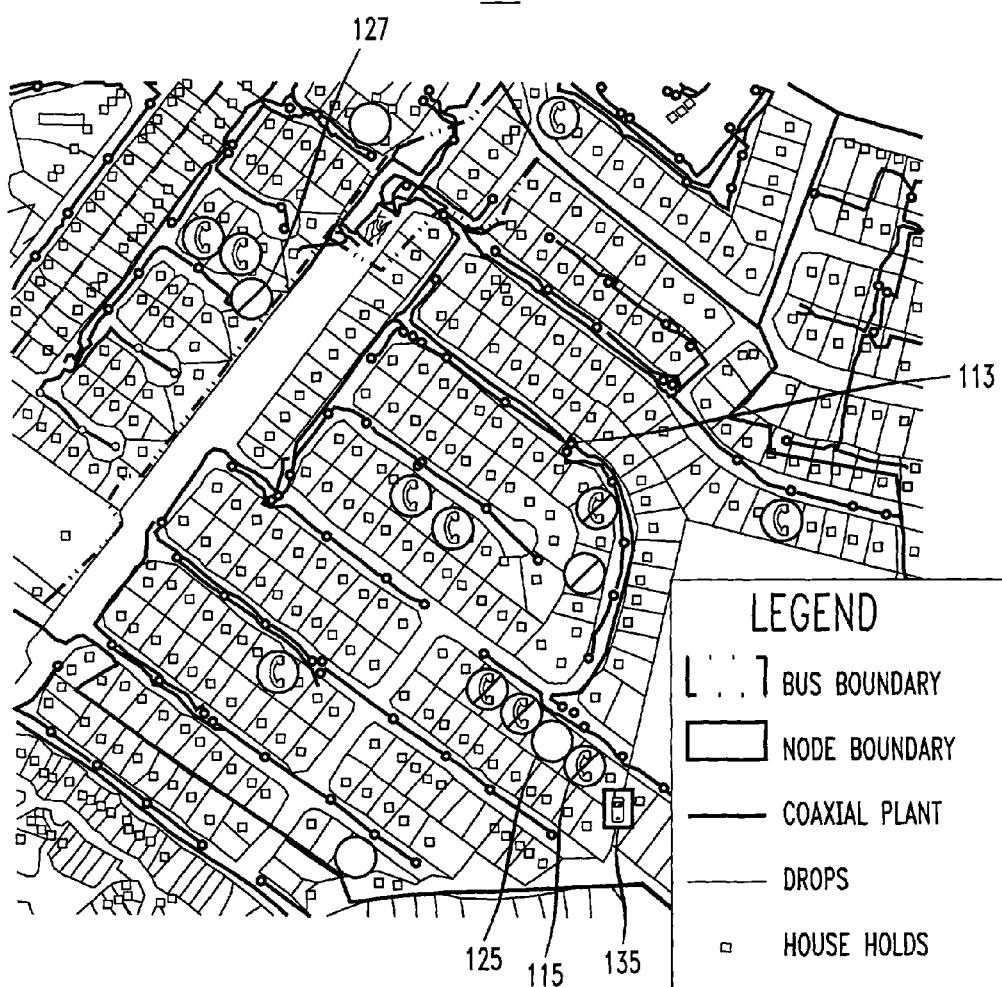

FIG. 7 illustrates a third visual correlation display 130 generated by AVT 90 which includes a new symbol 135 that indicates customer-reported troubles. Visual or automated correlation desirably includes all elements in HFC network 12 which could possibly become single points of failure for different services or service areas. This includes network elements which are physically but not logically related. For example: fiber facilities between the hub and the head end are not protected and are typically bundled with other node facilities. Automated or visual correlation must be able to identify those common points of failure which could affect several nodes 64, such as a fiber cut or failure of a power supply 75 which serves all or parts of several nodes. The plant database must include knowledge of fiber for different nodes 64 sharing a common fiber bundle 66.

d. Reports from SDI system in Support of Fault Management

Referring back to FIGS. 1-4, SDI system 93 provides query capability that includes two primary queries. One is a query by phone number, customer 14 name, service address, or NIU 76 serial number. The returning data would be customer 14 name, service address, latitude and longitude, each NIU 76 serving that customer and associated NIU serial number, telephone number associated with each port 72 on the NIU, fiber node 64, and HD. The second query would be a query by fiber node 64 or HDT 56. The returning data would be a list of customers and all NIUs 76 associated with customer 14.

Services-Specific Network Management Functions

The services-specific network management functions are those functions that are network management functions but are service-specific and are different for different services.

1. Network Capacity Management

Capacity management is a high-priority function because HFC network 12 supports advanced services (telephony, data, and video). There are four major components for telephony capacity management: 1) fixed capacity (voice ports) based on concentration per head end modem node and NIUs 76; 2) fixed capacity between HDT 56 and the local switch including interface group management; 3) capacity based on traffic pattern and analysis; and 4) customer reference value allocation and management. In the case of direct connect MDUs, capacity issues resolve around: 1) channel allocation, 2) transport capacity to local switch 24, 3) capacity based on traffic pattern and analysis, and 4) customer reference value allocation and management. The major components for data capacity management include: 1) fixed capacity based on the technology platform, 2) capacity based on traffic pattern and analysis, and 3) fixed capacity between CMTSs 54 and data service providers 32.

For telephony capacity management, SDI system 93 has telephony services modeled in its database. Based on business rules which govern the number of customers provisioned per head end modem, fixed capacity is derived. This measurement is used for example for capacity planning and for adding additional capacity to a hub.

2. Service Assurance (Trouble Ticketing and Administration)

Trouble ticketing system 102 in conjunction with HFC network management system 16 provides for a robust and efficient service assurance capability having improvements in system to human interface, system-to-system interoperability with other trouble ticketing systems, data storage systems and technician dispatch workflow systems, and network element management systems. Primary goals include automation of all aspects of trouble ticket generation, flow management, and closure to include escalation and event notification. A short cycle implementation of easily designed and modified schemas, data field sets, and report queries that can be managed by network operator administrators meet the requirement to support a dynamic operational and business environment. A peer-to-peer distributed server architecture with synchronized data storage is used to ensure performance and redundancy as concurrent user and managed network elements scale to an estimated 1000 operators and 45 million objects respectively.

Trouble ticketing system 102 includes a rules-based trouble management system software application that maximizes operational efficiencies through field auto population, rules-based ticket workflow, user and management team maintenance of trouble, solution and script text, markets, organizations, and user data. Trouble ticketing system 102 integrates with HFC network manager 88 for automatic trouble ticket generation. HFC network manager 88 identifies and locates alarms and modifies data fields based on rules/tables, HFC network manger 88 opens and auto-populates applicable data fields, and closes a trouble ticket.

3. Network Element Management

HFC network manager 88 communicates with element managers regarding network elements. HFC network manager 88 gathers performance, alarm, and use data from network equipment and communications facilities. HFC network manager 88 also distributes instructions to network elements so those maintenance tasks such as grooming, time slot assignment, provisioning, and inventory are performed from a central location.

HFC Network- and Services-Specific Functions

The HFC network- and services-specific functions are not separable into network related functions or services-specific functions. For example, for telephony service, the provisioning and configuration management cannot be broken out into network and services. This is because in the case of telephony service, until NIU 76 is installed, network configuration and provisioning is not complete. This is because NIU 76 is a managed network element and it is really port 72 off of the NIU that is activated during the service-provisioning process. Currently, for new service orders, the installation of an NIU 76 takes place only after the service is ordered (i.e., as a task related to service provisioning). The service configuration and provisioning takes place after NIU 76 is installed and a port 72 on the NIU is assigned for the telephony service.

1. Configuration Management

SDI system 93 has two components for configuration management: 1) network inventory and 2) network configuration. The network inventory is the inventory of actual network equipment (physical) and the network configuration describes how that equipment is configured and connected (physical and logical). The configuration information is vital to automate the provisioning process and perform effective fault management.

SDI system 93 is an object-oriented software system that does network inventory management and design management (circuit design). SDI system 93 defines and tracks a customer's network service path from customer location to HDTs 56 (and other network elements). SDI system 93 provides strict referential integrity for network equipment, network connectivity, customer's network service path, and services that are provisioned via this network service path.

The database of SDI system 93 models HFC network 12 using a data-rule structure. The data-rule structure represents the equipment, facility and service links, and provisioned telephony customers. The data structure further represents links between HDTs 56 and fiber nodes 64, NIUs 76, customer location, and aggregate links from the HDTs to the NIUs at customer 14 locations. The telephony serviceable household passed (HHP) data defines the base geographic units (cable runs) in the database of SDI system 93. The HHP data is accurately geo-coded including the relation of address location to fiber node 64, coax cable run 68, and latitude and longitude. The data-rule structure demonstrates the ability to capture the basic elements and relationships of HFC network 12 to support the NOC fault management process. SDI system 93 associates each telephony-ready household passed address to a fiber node 64 and coax cable bus 68 associated with this address. The database of SDI system 93 includes the data elements required to support the provisioning process and provides report capability to support network management alarm correlation and fault management.

SDI system 93 supports network inventory and topology data and acts as a configuration system that allows for changes to be made to the network. Significant changes to the network can be entered through a batch load process and small changes can be entered using a GUI interface. The data is needed from various sources such as engineering data (equipment and cable links), HHP data along with association of house to fiber node 64 and coax cable bus 68 it is served by, and data associated with customers 14 that were provisioned prior to SDI system deployment. The HHP data includes house key, address, latitude, longitude, fiber node 64, coax cable bus 68, hub 52 number, power supply 75, etc. The equipment location data includes location for fiber nodes 64 and hubs 52 with addresses, latitudes, and longitudes. The equipment data includes equipment profiles and equipment inventory such as HDTs 56, fiber nodes 64, forward and return paths, etc. The network cabling data includes data determined by system architecture and actual cabling inventory and includes relationships of node/forward path/reverse paths, laser transmitters and receivers, and power supplies. The network aggregate link data is based on equipment, cable inventory, and network architecture.

Figure 8:
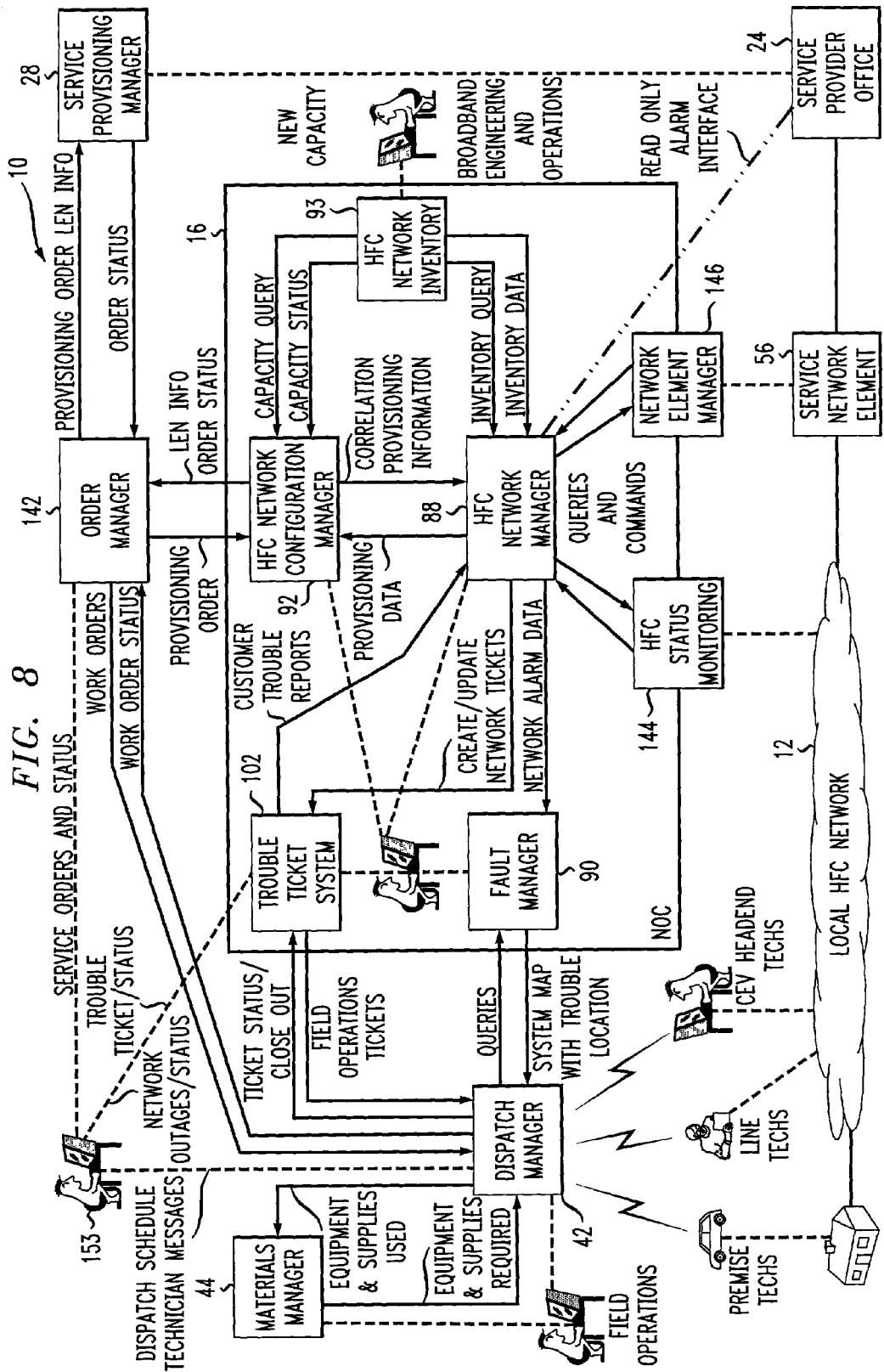
FIG. 8 illustrates a highly detailed view of the HFC network management system and the broadband network.

Referring now to FIG. 8, a highly detailed view of HFC network management system 16 within a broadband network environment is shown. In general, the applications of HFC network management system 16 normalize many of the variables that exist in HFC network 12 so as to allow the definition and support of provisioning and maintenance interfaces to the service management layers. The interfaces and set of service delivery processes and functions established are reusable for telephony, data, and video services because the same set of functions need to occur and only the rules are different based on the service-enabling network elements. This implies that any network management system application desirably is an object-based, component architecture solution which is rules- and tables-driven to provide the flexibility and scale to address a high-capacity multiple-services network element environment. The goal of HFC network management system 16 is to integrate and automate system support such that human intervention is minimally needed.

FIG. 8 represents a set of component systems and interfaces that are necessary to achieve integrated network management and automated HFC provisioning, automated trouble ticket generation, and automated fault management capabilities in a broadband network 10 having an HFC network 12. As introduced above, these are three key network management functions performed by HFC network management system 16.

Figure 9:
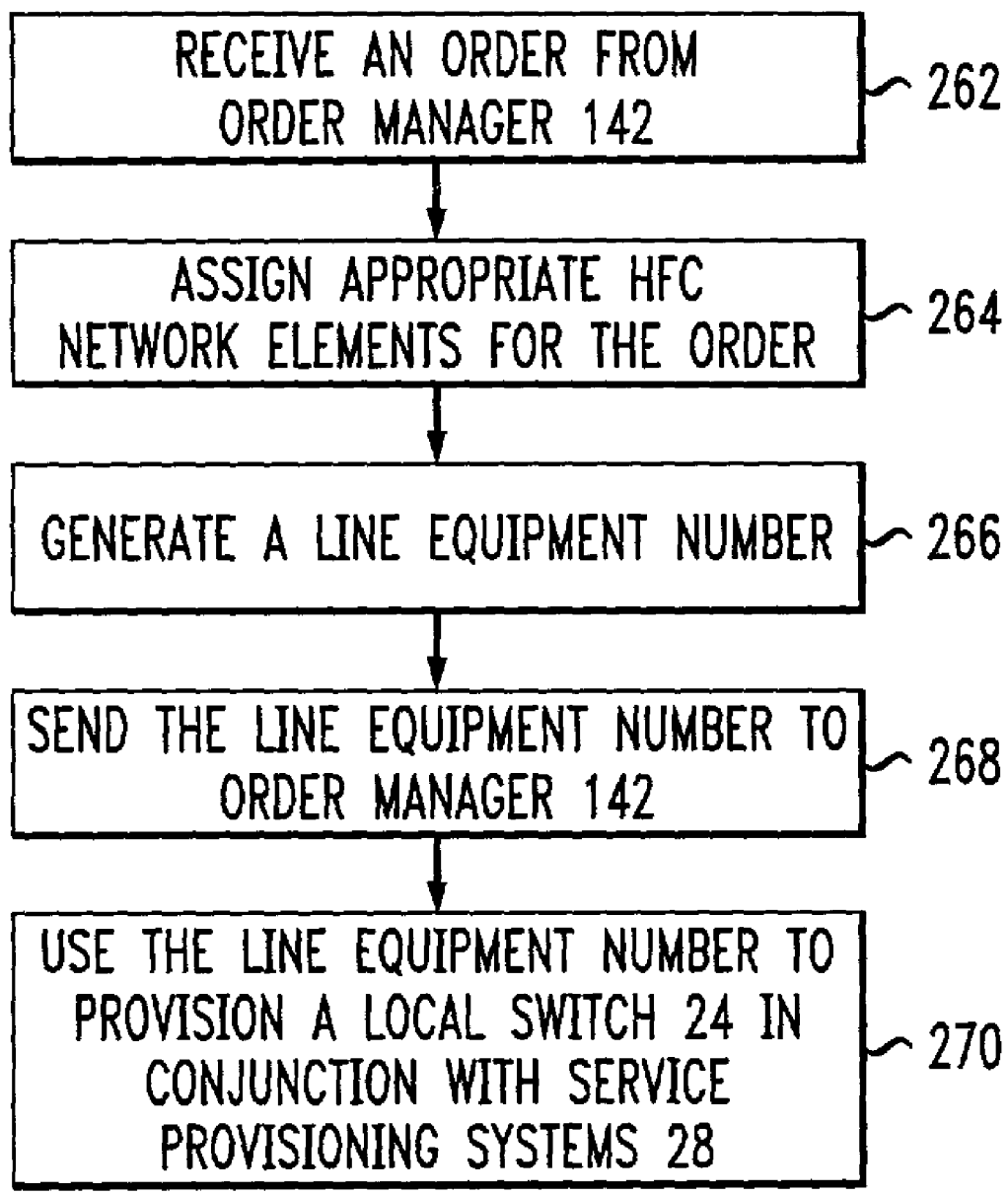
FIG. 9 illustrates a flow chart describing operation of the automation of HFC network provisioning in accordance with a preferred embodiment of the present invention.

The first key network management function is the automation of HFC provisioning. For example, after a customer service representative 153 takes an order for telephony service provisioning of the telephony service begins. The provisioning of a customer's telephone service has two primary considerations. The first consideration is to provision a logical HFC circuit connecting the appropriate CPE 76 to the corresponding appropriate head end office (HDT 56). The second consideration is provisioning a local switch 24 that delivers dial tone and features. Automation of HFC network provisioning means without manual intervention. As shown in flowchart 260 of FIG. 9, this translates into receiving an order from an order manager 142 as shown in block 262, assigning appropriate HFC network elements for that order as shown in block 264, generating a line equipment number (LEN) as shown in block 266, and sending the LEN back to the order manager (as shown in block 268) that can use the LEN to provision the local switch in conjunction with service provisioning systems 28 as shown in block 270.

The HFC service provisioning includes the assignment of HFC network components as shown in block 164 to create a logical circuit connecting the CPE to the corresponding appropriate hub office equipment. This includes traversing the various coax bus, fiber node, fiber path, and hub office equipment. The automation of HFC provisioning depends on the HFC network configuration data being readily available. The database of SDI system 93 supports automated provisioning by storing existing HFC network topology. The database of SDI system 93 has the ability to maintain a referential integrity of network equipment, network connectivity, and logical service paths associated with customer services.

Order manager 142 provides workflow control for the ordering and interactions with other processes such as billing and dispatch provided by dispatch manager 42. SDI system 93 is notified of an order request via an interface with order manager 142. SDI system 93 will transfer the order request to HFC network manager 88 which in turn then interfaces to HDT network element manager 146. HDT network element manager 146 then executes the provisioning commands.

There are five separate areas that should be automated to achieve fully automated designs in SDI system 93. The first is order creation entry of order data into the database of SDI system 93 which is performed by an interface to order manager 142 for full automation. The second is design—selection of the components (NIU 76, HDT 56, etc.). The third is implementation—sending HDT/HEM to the HDT network element manager 146, sending the LEN to order manager 142, and test data (from the HDT network element manager). The fourth is interfaces for systems such as SDI system 93, HFC network manager 88 can take an SDI system request and turn it into a sequence of commands necessary for provisioning a particular service on a particular piece of equipment. The fifth is broadband development—sequences of HFC network manager 88 that allow a single calling point to execute desired functions such as add new service, modify existing service, and delete service. This is required for each desired function in each particular piece of equipment.

Referring now back to FIG. 8, the second key network management function is automated trouble ticket creation. The following is a list of capabilities for accomplishing the goal of auto trouble ticket creation: data feed from fault manager 90 into outage tables of trouble ticket system 102; integration with customer service representative tools for enhanced automated rules-based diagnostic testing, capture, and auto-population of diagnostic information into appropriate data fields; integration with SDI system 93 via HFC network manager 88 to provide wide-scale and drill down system outage alert and notification for enhanced trouble correlation; an interface to include simple diagnostic tool interface and auto trouble ticket generation/assignment based on diagnostic results and rules/tables.

The third key network management function is automated fault management. HFC status monitoring 144 of HFC network manager 88 monitors HFC network 12 for configuration and problem status. Similarly, network element manager 146 of HFC network manager 88 monitors service network element 56 (i.e., HDT, CMTS, and video equipment) for configuration and problem status. HFC network manager 88 generates alarm data if there are any problems. Fault manager 90 uses the alarm data in conjunction with the network configuration data stored in the database of SDI system 93 to generate a graphical display of the location and type of problems.

Figure 10:
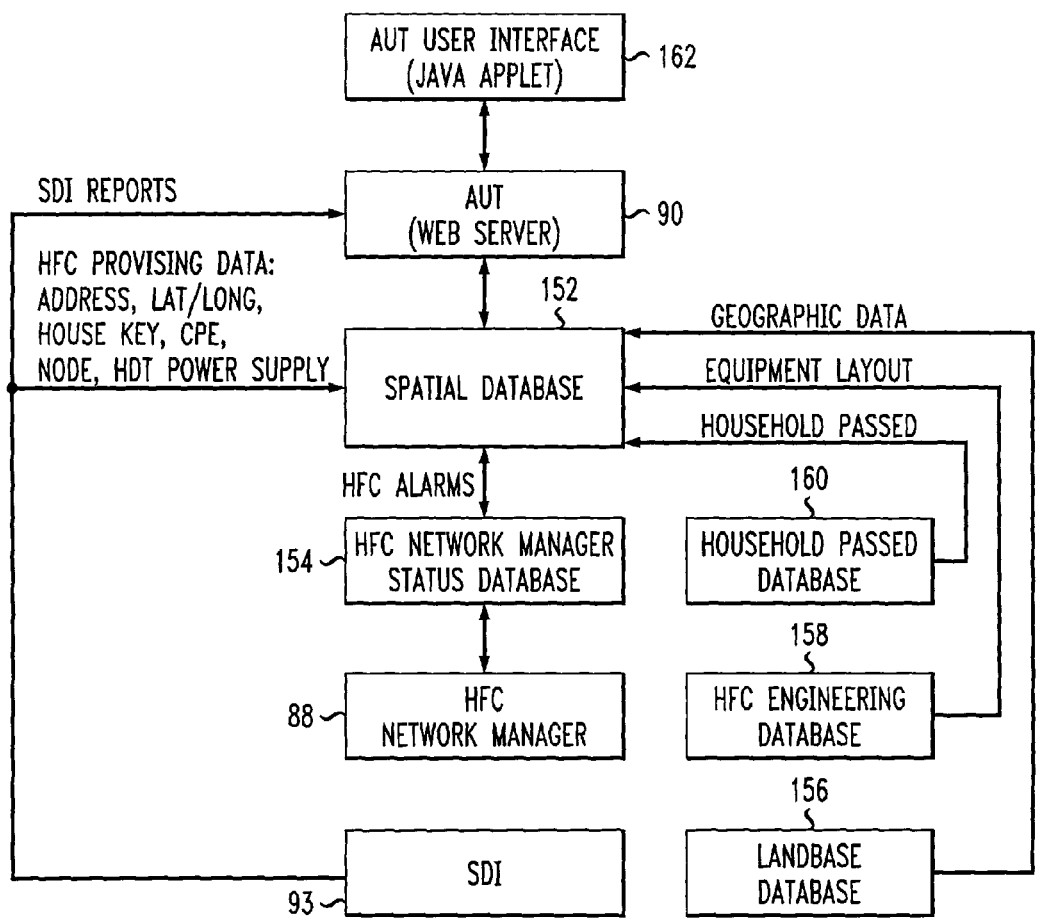
FIG. 10 illustrates a block diagram describing the architecture of the alarm visualization tool (AVT) of the HFC network management system and associated AVT data flow.

Referring now to FIG. 10 and with continual reference to FIGS. 2, 5, 6, and 7, a block diagram 150 describing the architecture of AVT 90 and associated data flow is shown. As described above, AVT 90 provides graphical visualization of HFC network 12 and service alarms. This alarm visualization capability assists network operations center (NOC) 94 in the trouble sectionalization, isolation, and resolution process. In general, AVT 90 provides geographic displays with varying zoom levels, from country to neighborhood and street and household levels, overlaid with fiber node 64 boundary, distribution cable plant 68 layout, and equipment at single-dwelling unit (SDU) and multiple-dwelling unit (MDU) premises. The geographic displays also represent head end 52 locations, associated hubs, secondary hubs, fiber nodes 64, and fiber layer 66 between them.

Alarm and status information is shown via color codes and icons represent equipment. Through these geographic displays NOC 94 can visually correlate event information. To help further in the trouble isolation process, operators can access diagnostic tools and obtain reports about customer 14, the service, and the equipment.

AVT 90 focuses on the fault management functional area of HFC network 12 operations. Manual correlation of information available from network elements is currently used to isolate problems. This method, while demonstrative of the effectiveness of correlation, is time consuming and may result in details being overlooked due its manual nature. Enhanced correlation methods for fault management can be obtained through combining automated, visual, and cross-product correlation of customer-related problems and network element status information. By developing a system that can present this information in an automated user-friendly fashion operators can correlate problems in HFC network due to their root cause and location.

AVT 90 focuses on the visual correlation and includes the following components: a graphical visual display system to accurately display street maps of the market regions that have been overlaid with HFC cable plant 68 diagrams, color-coded dynamic alert information representing type of service, status of intelligent network elements, and the customer reported problems; and geo-coded network elements and customer service addresses that enable symbols to be accurately displayed on maps relative to streets and physical plant.

AVT 90 provides NOC 94 with the ability to rapidly identify telephony, data, video, and VoIP alarms, communicate the type of alarm and location of the alarm, and track the resolution of the alarms to provide superior customer service. One objective of AVT 90 is to maximize the efficiency and effectiveness of NOC 94 in identifying HFC network and supported service-affecting alarms, and correlating these alarms to customer proximity, plant and equipment proximity, and connectivity proximity for the resolution of alarms, problems, and customer service. This objective is accomplished by: 1) consolidating alarm data, location and connectivity data, and spatial data from separate databases; 2) visually representing this consolidated information in a geographic format on a map (point on a map); and 3) displaying SDI system reports for the selected SDI system point (i.e., providing the underlying data behind the point on a map as requested). In summary, AVT 90 creates a map which enables underlying data from several databases to visually represent an alarm, customer proximity, plant and equipment, and HFC network connectivity pinpoints and to summarize this information.

As shown in FIG. 10, AVT 90 is located on a web server and is operable with a spatial database 152 for receiving data stored in several databases. Spatial database 152 receives alarm data from an HFC network manager status database 154. HFC network manager 88 monitors HFC network 12 and provides the alarm data to HFC network manager status database 154. HFC network manager status database 154 converts the alarm data from HFC network manager 88 into data ready to be used by spatial database 152. SDI system 93 provides provisioning (for example, location and connectivity data) data indicative of the logical relationship between various network elements and the service address information to spatial database 152 for the alarm data correlation processing. SDI system 93 also produces customer affecting reports for AVT 90. Geographical/spatial data is available for spatial database 152 as a reference source to convert the service address to geographical coordinates. A landbase database 156 provides the geographic data to spatial database 152. An HFC engineering database 158 provides equipment layout data to spatial database 152 and a household passed database 160 provides household passed data to the spatial database. AVT user interface 162 is the graphical display system for displaying the alarms and the related information on electronic maps.

The following table describes the various data sources and types of data interchanged among the elements involved with AVT 90.

| From | Data Category and Items |
|---|---|
| HFC network manager 88 | Alarm data: NIU 76, fiber node 64, and power supply 75 alerts. |
| SDI system 93 | Location and connectivity data (reports)/Report elements: customer name, customer address, location (latitude/longitude), power supply, node #, voice port/RSU serial #, HDT #, DMC #, HEM #, and phone #. |

-continued

| From | Data Category and Items |
| --- | --- |
| landbase database 156 | Geographic data |
| HFC engineering database 158 | Engineering plant data |
| Household passed database 160 | Household passed data. |

The following table describes the data that is displayed by AVT 90.

| Data Catergory | Data Items |
| --- | --- |
| Geographical information | Land base and engineering plant. |
| Alarms | Critical, major, and minor. Alarm color code will follow the following standard.<br>Clear: normal icon (outline).<br>Informational: magenta.<br>Warning: blue.<br>Minor: yellow.<br>Major: orange.<br>Critical: red. |
| Alarm related underlying data | SDI system reports. |
| Alarm related information | Device name as provided by HFC network manager 88.<br>Equipment type description (e.g., NIU (Voice Port/RSU), node).<br>Alarm severity<br>Time stamp of alarm occurence.<br>Latitude/longitude of location of problem.<br>Customer name, address, and telephone number (if the alarmed equipment is CPE). |

1. AVT Alarm Displays—Alarm Data

AVT 90 provides displays of the following types of HFC network alarms: NIU 76 (voice port/RSU) alerts, fiber node 64 alerts, and power supply 75 alerts. AVT 90 allows operators to select an alarmed network element and access HFC network manager 88 for alarm details associated with that network element. From a map display, AVT 90 allows operators to list the alarm information available at spatial database 152 for a selected network element in order to assist operators in investigating some particular alarm condition. The available alarm information includes the alarm-related information listed in the table above. AVT 90 further allows operators to obtain element name mapping tables in order to obtain name conversions for network elements named differently by the various alarm and configuration data sources. In effect, operators are able to query a network element name and have all other names associated with the network element displayed. AVT 90 uses the following information from spatial database 152 for the alarm displays: node boundary, landbase, and engineering plant. AVT 90 provides the ability to display the following underlying landbase data with the same orientation: road edge, roads, street names and text labels, states, counties, cities, hydrology, parks, urban boundaries, property parcels, and railroads.

AVT 90 includes the ability to display the following reports generated by SDI system 93: 1) customer service/equipment query; 2) equipment impacted by power alarm; 3) customers impacted by alarmed equipment; 4) HFC telephony provisioning work order; and 5) location, equipment, and services by house key.

2. AVT Alarm Displays—Alarm Characteristics

AVT 90 depicts equipment, alarms, and status information with consistent and reasonably descriptive representations. The display of equipment, alarms, and status information by AVT 90 uses representations and colors that are consistent throughout the AVT and other related applications. AVT 90 includes the capability to pan and zoom in and out while displaying appropriate details of the layer based on the selected zoom factor. The scale and shape of icons on the display of AVT 90 corresponds with the street to market level zoom level so that individual icons can remain visible without occupying the entire display. AVT 90 aggregates all icons within a node boundary into a single circular dot for each fiber node 64 boundary at the market level view. From the dot, an operator is able to access the attribute information for the corresponding fiber node 64. AVT 90 aggregates all icons related to a hub and equipment served by the hub into a single circular dot at the country level view. AVT 90 uses consistent text abbreviations to indicate the alarm severity where needed. AVT 90 updates the displays autonomously when changes to the alarm information shown within a visible area arrives.

3. AVT Alarm Displays—Default Settings for Functional Groups

The default settings for functional groups are intended to allow an operator to select a functional group which defines a map view that is displayed when the operator starts the AVT 90. The functional group will also determine default map layer settings. AVT 90 allows administrators to define functional group profiles. The functional group profile includes the name of the functional group, home map view, and default layers. For example, the default layers include alarm points, node equipment, node boundary, telephony CPE, and telephony hub equipment.

4. AVT Alarm Displays—Navigation Aids

The navigation aids described here augment the zoom and pan controls and are intended to allow operators to maneuver to particular information directly without having to pan or traverse various zoom layers. AVT 90 includes a "find equipment" function providing a mechanism for operators to type in information (e.g., NIU serial number, home address, and HDT equipment name) resulting in the display to center on the identified element with the element visible. AVT 90 includes a "find node" function providing a mechanism for operators to type in a node ID resulting in the display to zoom to a view that shows the fiber node and the associated fiber node boundary. AVT 90 includes a "find hub" function that allows operators to navigate to the view depicting the hub and fiber nodes served by the hub. AVT 90 is able to navigate from an alarm representation at an aggregate display to the view depicting the equipment associated with that alarm. AVT 90 includes the following display layers: alarm points (geo-coded alarms represented as circular dots on the display), alarm polygons (geographical area impacted by an alarm point), fiber node 64 equipment, power supply 75, fiber node boundary (geographical area served by a fiber node), fiber plant 66 (fiber component of the HFC network, from the fiber nodes to head end 52, that carries the optical signals both upstream and downstream), coax plant 68 (coaxial component of the HFC network, from the fiber nodes to CPE 74, that carries the electrical signals both upstream and downstream), landbase (basic geographical mapping data on which engineering data is overlaid), property parcels (property boundaries included in the landbase), telephony CPE (NIU 76), and telephony hub equipment. AVT 90 further allows operators to print and save images of the current map display.

Figure 11:
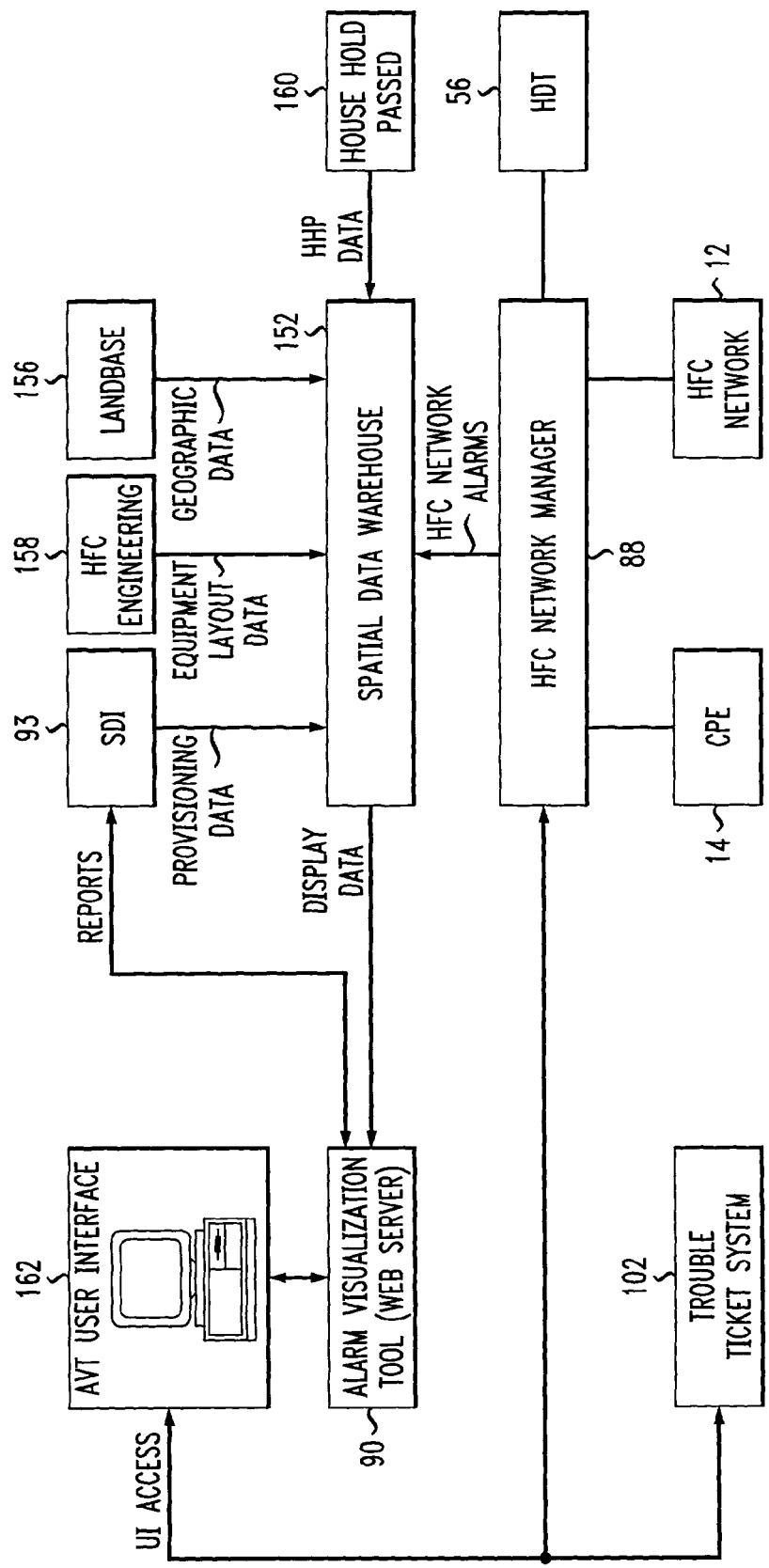

Referring now to FIG. 11, a block diagram of AVT 90 within a first HFC network management configuration 170 is shown. First configuration 170 supports fault management with respect to telephony services. Within first configuration 170, AVT 90 represents aggregate head end, primary hub, second hub, and fiber node 64 locations and the connectivity between them in order for an operator to see possible relationships between alarms posted against these locations. Attribute information for HDT 56 is displayed by AVT 90. The attribute information of HDT 56 includes equipment type, equipment description, equipment ID, and element manager. SDI system 93 provides the attribute information to AVT 90. AVT 90 allows operators to access equipment displays for HDTs 56 deployed at a head end 52. The display of HDT 56 deployed at a head end 52 shows shelf/card level configuration information along with an indication of the most severe alarm associated with each equipment and card. To determine the impact of a particular HDT 56 alarm, AVT 90 allows operators to access "impacted customer" reports from SDI system 93. After selecting a particular alarm associated with HDT 56, operators are able to request a printable listing of customers impacted by the alarm, sorted by customer phone number, showing NIU/RSU identification, customer name, and customer phone number.

The attribute information for network and CPE elements includes the corresponding latitude and longitude. When multiple, concurrent alarms are associated with an icon, AVT 90 color-codes the icon with the highest severity alarm and also show an indication that more alarms are associated with that icon. AVT 90 allows operators to list the currently active alarms associated with an icon in reverse chronological order.

From the map display AVT 90 allows operators to list the telephony alarm information available at spatial database 152 for a selected network element. The available telephony alarm information includes device name as provided by HFC network manager 88, equipment type description (e.g., HDT 56, NIU/RSU 76, fiber node 64), alarm severity, time stamp of alarm occurrence, alarm state (acknowledged or not acknowledged), and customer name and telephone number (if the alarmed equipment is CPE). AVT 90 allows operators to access alarm details associated with a selected network element.

AVT 90 provides a visually changed representation of the acknowledged alarms to notify operators that someone is working on the particular trouble. AVT 90 also allows operators to acknowledge the alarms. AVT 90 allows operators to define functional group profiles including name of functional group, home map view, and default display layers. The default display layers include alarm points, trouble tickets, alarm polygons, fiber node equipment and boundaries, fiber plant 66, coax plant 68, landbase, property parcels, CPE 74, 76, and 78, and HDT 56 (and HSD, CPE, and HSD head end equipment as described with respect to FIG. 12).

AVT 90 provides a find equipment function that allows operators to navigate to the view depicting the selected equipment. Operators can enter equipment information (e.g., CPE serial number, home address, HDT name) resulting in the display to center on the identified element with the element visible. (As described with respect to FIG. 12, the equipment-identifying information includes domain name or IP address of CMTS equipment 54 and IP address of MAC address of cable modems 74.)

AVT 90 provides a find node function that allows operators to navigate to the view depicting fiber node 64 and fiber node boundary. The find node function provides a mechanism for operators to type in a fiber node 64 ID resulting in the display zooming to a view that shows the node and associated fiber node boundary.

AVT 90 provides a find head end function that allows operators to navigate to the view depicting the head 52 end and fiber nodes 64 served by that head end. AVT 90 also allows operators to navigate from an alarm representation at an aggregate display to the view depicting the equipment associated with that alarm.

Figure 12:
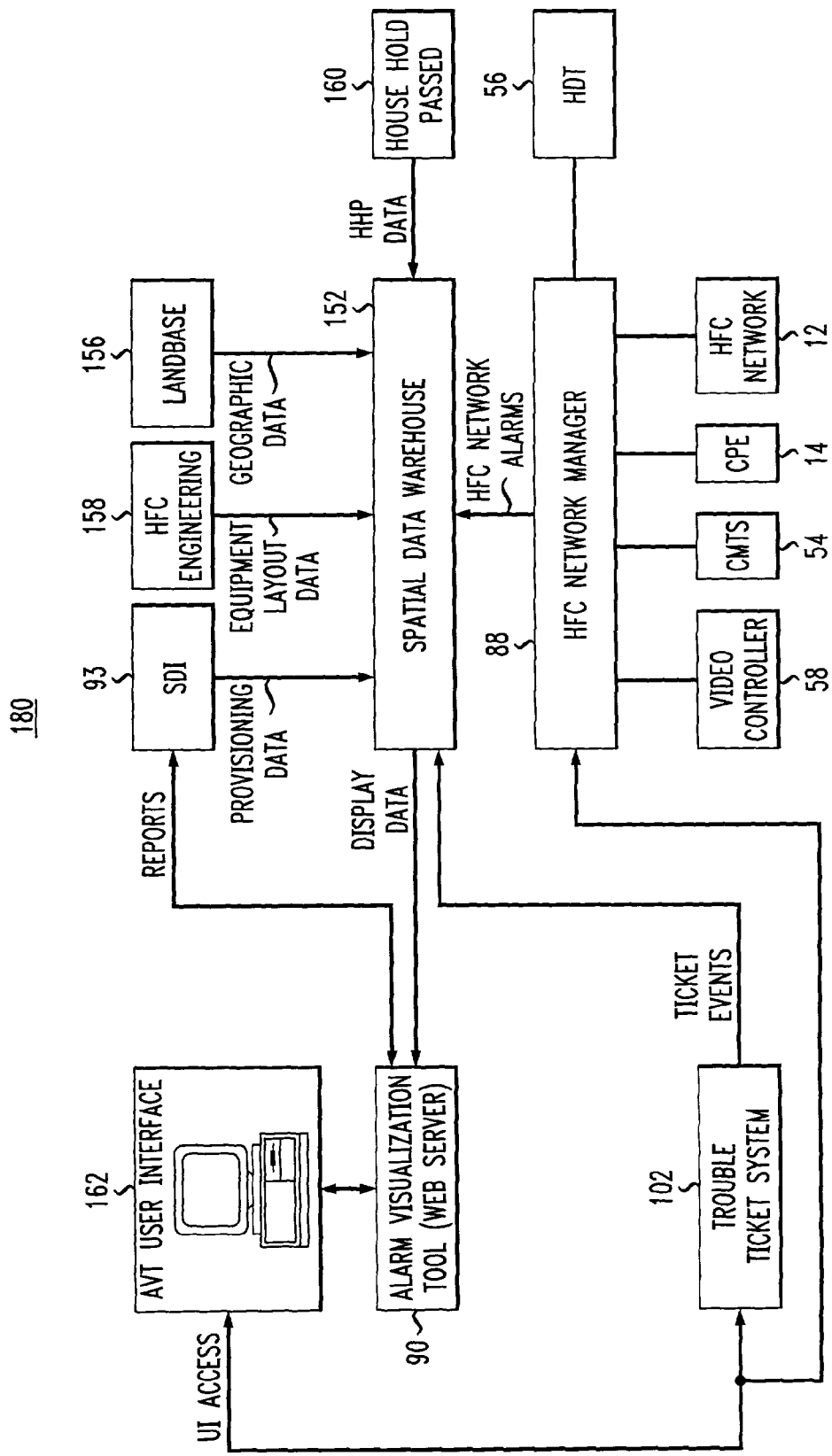

Referring now to FIG. 12, a block diagram of AVT 90 within a second HFC network management configuration 180 is shown. Second configuration 180 supports fault management with respect to telephony, data, and video services. Second configuration 180 includes integrating trouble ticket indicators into the visual trouble isolation environment to assist operators in the recognition of trouble ticket patterns, clusters, and relationships of trouble tickets to autonomously reported HFC network alarms.

Within second configuration 180, AVT 90 is able to show via a special icon that one or more trouble tickets have been posted in trouble ticket system 102 against a particular network element (e.g., CPE 74, 76, and 78, HDT 56, CMTS 54, etc.). This allows operators to know that an alarm and trouble ticket is associated with certain equipment. In order to indicate that multiple, concurrent trouble tickets are posted against a network element, AVT 90 uses a similar method as showing multiple alarms posted against a network element. The trouble ticket indicator reflects the highest priority trouble ticket and some indication that multiple, concurrent trouble tickets exist. Operators are able to obtain a list of these concurrent trouble tickets showing trouble ticket numbers, status, and priority in reverse chronological order by ticket start time/date. From the displayed trouble ticket indicator, AVT 90 allows operators access to trouble ticket related information stored in spatial database 152. This information includes equipment name/ID (or customer name if the trouble ticket is not associated with equipment and includes customer information), trouble ticket number, trouble ticket category, date and time of trouble start, and ticket priority.

AVT 90 provides a find trouble ticket function that allows operators to navigate to the view depicting the requested trouble ticket. AVT 90 represents the trouble ticket priority on the displays by color-coding the trouble ticket indicator (e.g., icon) using the same colors used to show alarm severity. From the map display, operators can obtain a printable listing of trouble tickets (trouble ticket information to be printed for each trouble ticket) contained within a selected area.

Second configuration 180 is intended to support trouble isolation of HFC network 12 which provides data and video services in addition to telephony services. Providing a common trouble ticket isolation environment for telephony, data, and video services will increasingly become more important as service markets overlap. AVT 90 assists in identifying HFC network problems impacting all of these services rather than replicated service for each market thereby facilitating single trouble shooting and resolution activities. As for telephony markets, visualizing data- and video-related trouble tickets on map displays is expected to help operators recognize potential problems within the service provider's infrastructure. The representation of and access to data- and video-related information via AVT 90 is intended to be consistent with the representation of and access to telephony-related information.

With respect to cable modems 74 at customer-premises 14, AVT 90 displays detailed views of home locations which identify cable modems and depict the cable modem's alarm severity and status. AVT 90 depicts cable modems 74 at customer-premises 14 location using a separate symbol than currently used for the NIU/RSU 76. The representation of alarm severity follows the same color-coding as described for the telephony services. Also, the alarm status (acknowledged or not acknowledged) is represented as described for the telephony services. The mechanisms for multiple concurrent alarms and access to alarm detail information is the same for telephony equipment.

Attribute information for cable modems is accessible via AVT 90 and includes cable modem's 74 IP address. The database of SDI system 93 inventories cable modem's 74 IP address. AVT 90 allows operators to access customer, service, and upstream connectivity reports associated with a customer's 14 cable modem 74 from SDI system 93. AVT 90 allows operators to access cable modem-related reports from SDI system 93 similar to the telephony services. The report information includes customer name, address, phone number, ISP login, service, IP address of cable modem 74, and upstream connectivity. AVT 90 provides context-sensitive access to cable modem 74 and CMTS 54 diagnostic functions.

Attribute information for CMTS 54 is accessible via AVT 90 and includes equipment type, equipment domain name, IP address, and element manager. The database of SDI system 93 inventories the information of CMTS 54. From the map displays AVT 90 provides configuration information for a selected CMTS 54. The CMTS configuration information includes configured Ethernet interfaces facing the router toward the regional data center, configured upstream cards facing HFC network 12 and customer 14, configured cable modems 74 (IP and MAC address) per CMTS 54 upstream card. Per cable modem 74 the information includes node name, customer name, address, phone, and customer login. In order to determine the impact of a particular CMTS 54 alarm, AVT 90 allows operators to access impacted customer reports from SDI system 93.

Figure 13:
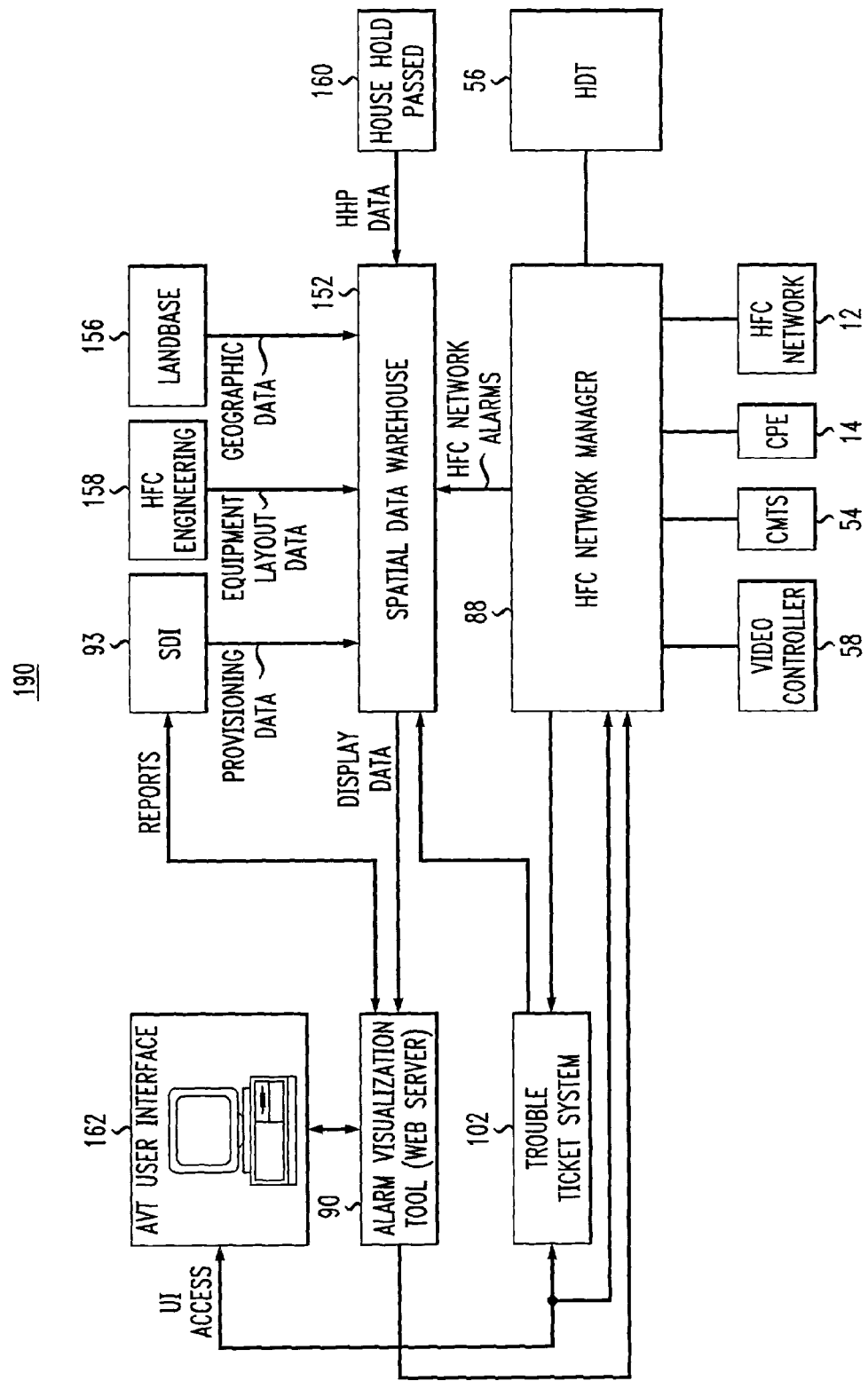

Referring now to FIG. 13, a block diagram of AVT 90 within a third HFC network management configuration 190 is shown. Within third configuration 190, AVT 90 is operable with HFC network manager 88 and trouble ticket system 102 to provide operators with the means to launch trouble tickets with auto-populated equipment and alarm information. AVT 90 displays maps that allow operators to select specific equipment (e.g., HDT 56, CMTS 54, NIU 76, cable mode 74, etc.) and create a trouble ticket with relevant data auto-populated. Such data includes equipment data, alarm status, and operator information. The trouble tickets created via AVT 90 are consistent with trouble tickets launched from the alarm originating system (HFC network manager 88) allowing trouble ticket system 102 to detect possibly redundant trouble tickets at the time of creation.

Referring now to FIG. 14, a block diagram of a fourth HFC network management configuration 200 is shown. Within fourth configuration 200, AVT 90 is operable with a correlation system 202 for representing correlated alarms. The primary focus of correlation system 202 is to correlate, aggregate, and redistribute event information from multiple sources to operators. The mechanisms to deliver correlated information to operators includes a common event list for trouble identification and prioritization that allows event displays filtered by criteria such as per market or multiple markets and services.

Thus it is apparent that there has been provided, in accordance with the present invention, a method and system for generating visual displays of hybrid fiber coax (HFC) network data that fully satisfy the objects, aims, and advantages set forth above. It is to be understood that the method and system in accordance with the present invention may be used to manage other broadband networks providing multiple services such as fixed wireless networks. While the present invention has been described in conjunction with specific embodiments thereof, it is evident that many alternatives, modifications, and variations will be apparent to those skilled in the art in light of the foregoing description. Accordingly, it is intended to embrace all such alternatives.

What is claimed is:

1. A broadband network comprising:
   a hybrid fiber coax (HFC) network having network elements operable for communicating telephony, data, and video signals with customer-premises equipment of subscribers;
   an HFC network manager for monitoring status and configuration of the network elements and the customer-premises equipment, wherein the HFC network manager generates alarm data indicative of improper status and configuration of the network elements and the customer-premises equipment;
   a service, design, and inventory (SDI) database operable with the HFC network manager for storing data indicative of the configuration of the network elements and the customer-premises equipment, wherein the database further stores data indicative of physical and logical connections between the network elements and the customer-premises equipment;
   a fault manager having an alarm visualization tool operable with the HFC network manager and the database for generating visual displays of the status and configuration of the network elements and the customer-premises equipment overlaid with the alarm data along with the physical and logical connections between the network elements and the customer-premises equipment;
   a trouble ticket system operable for generating trouble ticket alerts in response to improper status of at least one of the network elements and the customer-premises equipment, wherein the alarm visualization tool is operable with the trouble ticket system for displaying the trouble ticket alerts for the at least one of the network elements and the customer-premises equipment having improper status on the visual displays; and
   a correlation system for correlating data including trouble ticket alerts generated by the trouble ticket system and the status of the network elements and the customer-premises equipment, wherein the alarm visualization tool displays the correlated data on the visual displays.

2. The broadband network of claim 1 further comprising:
   a landbase database for storing data indicative of geography of the broadband network, wherein the alarm visualization tool is operable with the HFC network manager, the SDI database, and the landbase database for generating the visual displays overlaid with the geography of the broadband network.

3. The broadband network of claim 1 further comprising:
   an HFC network engineering database for storing data indicative of engineering layout of the broadband network, wherein the alarm visualization tool is operable with the HFC network manager, the SDI database, and the HFC network engineering database for generating the visual displays overlaid with the engineering layout of the broadband network.

4. The broadband network of claim 1 further comprising:
   a household passed database for storing data indicative of households passed in the broadband network, wherein the alarm visualization tool is operable with the HFC network manager, the SDI database, and the household passed database for generating the visual displays overlaid with the households passed in the broadband network.

5. The broadband network of claim 1 wherein:
the network elements include a host digital terminal (HDT) for communicating the telephony signals, a cable modem termination system (CMTS) for communicating the data signals, and video equipment for communicating the video signals, wherein the network elements further include a fiber optics node connected at one end to the HDT, the CMTS, and the video equipment by a fiber optics network and connected at the other end to the customer-premises equipment by coax.

6. The broadband network of claim 1 wherein:
the alarm visualization tool generates visual displays of the alarm data via at least one of color codes and icons representing the network elements and the customer-premises equipment.

7. The broadband network claim 1 wherein:
the SDI database is operable to generate an SDI report for at least one of a network element and a customer-premises equipment, the report including information about the at least one network element and the customer-premises equipment, wherein the alarm visualization tool is operable for the displaying SDI reports for a selected network element and customer-premises equipment on the visual displays.

8. The broadband network of claim 1 wherein:
the alarm visualization tool is operable with HFC network manager and the trouble ticket system for generating trouble ticket alerts with auto-populated status information.

9. In a broadband network having a hybrid fiber coax (HFC) network provided with network elements operable for communicating telephony, data, and video signals with customer-premises equipment of subscribers, a network management method for managing the broadband network, the network management method comprising:
monitoring status of the network elements and the customer-premises equipment of subscribers;
monitoring the configuration including the assigned capacity of the network elements and the customer-premises equipment;
generating alarm data indicative of improper status or configuration of the network elements and the customer-premises equipment;
storing data indicative of the status and the configuration of the network elements and the customer-premises equipment;
storing data indicative of physical and logical connections between the network elements and the customer-premises equipment; and
generating visual displays of the status and configuration including the assigned capacity of the network elements and the customer-premises equipment overlaid with the alarm data and overlaid with the physical and logical connections between the network elements and the customer-premises equipment based on the stored data.

10. The HFC network management method of claim 9 further comprising:
storing data indicative of geography of the broadband network, wherein generating visual displays includes generating the visual displays overlaid with the geography of the broadband network.

11. The HFC network management method of claim 9 further comprising:
storing data indicative of engineering layout of the broadband network, wherein generating visual displays includes generating the visual displays overlaid with the engineering layout of the broadband network.

12. The HFC network management method of claim 9 further comprising:
storing data indicative of households passed in the broadband network, wherein generating visual displays includes generating the visual displays overlaid with the households passed in the broadband network.

13. The HFC network management method of claim 9 further comprising:
generating trouble ticket alerts in response to improper status of at least one of the network elements and the customer-premises equipment, wherein generating visual displays includes displaying the trouble ticket alerts for the at least one of the network elements and the customer-premises equipment having improper status on the visual displays.

* * * * *